: US 6,256,400 B1
(45) Date of Patent: Jul. 3, 2001

(12) United States Patent
Takata et al.

(54) METHOD AND DEVICE FOR SEGMENTING HAND GESTURES

(75) Inventors: Yuji Takata; Hideaki Matsuo, both of Fukuoka; Seiji Igi; Shan Lu, both of Tokorozawa; Yuji Nagashima, Fuchu, all of (JP)

(73) Assignees: Matsushita Electric Industrial Co., Ltd., Osaka; Communications Research Laboratory, Independent Administration Institution, Tokyo, both of (JP)

( * ) Notice: Subject to any disclaimer, the term of this patent is extended or adjusted under 35 U.S.C. 154(b) by 0 days.

(21) Appl. No.: 09/406,733

(22) Filed: Sep. 28, 1999

(30) Foreign Application Priority Data

Sep. 28, 1998 (JP) ................................... 10-273966

(51) Int. Cl.[7] .................................................. H04M 11/00
(52) U.S. Cl. ............................. 382/103; 382/171; 379/52
(58) Field of Search .................................... 382/103, 276, 382/236, 107, 199, 171; 379/52, 219; 348/20, 700; 704/271; 434/112, 307; 345/9, 156

(56) References Cited

U.S. PATENT DOCUMENTS

| | | | | |
|---|---|---|---|---|
| 4,878,843 | * | 11/1989 | Kuch ................................ 434/112 |
| 5,422,653 | * | 6/1995 | Maguire, Jr. ........................ 345/9 |
| 5,759,044 | * | 6/1998 | Redmond ......................... 434/307 |
| 5,774,591 | * | 6/1998 | Black et al. ..................... 382/236 |
| 5,802,220 | * | 9/1998 | Black et al. ..................... 382/276 |
| 5,832,115 | * | 11/1998 | Rosenberg ....................... 382/199 |
| 5,859,904 | * | 1/1999 | Huang ............................. 379/219 |
| 5,890,120 | * | 3/1999 | Haskell et al. ................... 704/271 |
| 5,930,379 | * | 7/1999 | Rehg et al. ...................... 382/107 |
| 5,953,052 | * | 9/1999 | McNelley et al. ................. 348/20 |
| 5,982,853 | * | 11/1999 | Liebermann ....................... 379/52 |
| 5,990,865 | * | 11/1999 | Gard ............................... 345/156 |
| 5,990,980 | * | 11/1999 | Golin .............................. 348/700 |

FOREIGN PATENT DOCUMENTS 7-282235   10/1995   (JP) .
9-44668    2/1997    (JP) .

OTHER PUBLICATIONS

"Face Detection from Color Images by Fuzzy Pattern Matching" by Wu, Chen and Yachida; paper published by the Electronic Information Communications Society, D–II vol. J80–D–II No. 7 pp. 1774 to 1785, '97.7.

* cited by examiner

Primary Examiner—Matthew C. Bella
Assistant Examiner—Choobin Mahmood
(74) Attorney, Agent, or Firm—Wenderoth, Lind & Ponack, L.L.P.

(57) ABSTRACT

An object of the present invention is to provide a method of segmenting hand gestures which automatically segments hand gestures to be detected into words or apprehensible units structured by a plurality of words when recognizing the hand gestures without the user's presentation where to segment. Transition feature data in which a feature of a transition gesture being not observed during a gesture representing a word but is described when transiting from a gesture to another is previously stored. Thereafter, a motion of image corresponding to the part of body in which the transition gesture is observed is detected (step S106), the detected motion of image is compared with the transition feature data (step S107), and a time position where the transition gesture is observed is determined so as to segment the hand gestures (step S108).

33 Claims, 25 Drawing Sheets

| BODY FEATURE | MOTION FEATURE |
|---|---|
| FACE REGION | TIP OF CHIN WHEN NODDING |
| EYES | BLINKING |
| MOUTH | CHANGE IN SHAPE OF MOUTH |
| HAND REGION, BODY | STOP GESTURE |
| HAND REGION, FACE REGION | TOUCHING FACE WITH HAND(S) |
| HAND REGION | POINT WHERE EFFECTIVENESS OF HANDS CHANGES |

| BARYCENTRIC COORDINATES | (320, 350) | 801 |
| --- | --- | --- |
| AREA | 4532 | 802 |
| LATERAL MAXIMUM LENGTH | 305 | 803 |
| VERTICAL MAXIMUM LENGTH | 395 | 804 |

FIG. 9

| MOVEMENT CODE | CONDITION |
|---|---|
| 1 | $\dfrac{\sqrt{3}}{2} \leq \dfrac{xvf[i]}{\sqrt{xvf[i]^2 + yvf[i]^2}}$ |
| 2 | $\dfrac{\sqrt{3}}{2} > \dfrac{xvf[i]}{\sqrt{xvf[i]^2 + yvf[i]^2}} > 0$ & $\dfrac{\sqrt{3}}{2} > \dfrac{yvf[i]}{\sqrt{xvf[i]^2 + yvf[i]^2}} > 0$ |
| 3 | $\dfrac{\sqrt{3}}{2} \leq \dfrac{yvf[i]}{\sqrt{xvf[i]^2 + yvf[i]^2}}$ |
| 4 | $-\dfrac{\sqrt{3}}{2} < \dfrac{xvf[i]}{\sqrt{xvf[i]^2 + yvf[i]^2}} < 0$ & $\dfrac{\sqrt{3}}{2} > \dfrac{yvf[i]}{\sqrt{xvf[i]^2 + yvf[i]^2}} > 0$ |
| 5 | $-\dfrac{\sqrt{3}}{2} \geq \dfrac{xvf[i]}{\sqrt{xvf[i]^2 + yvf[i]^2}}$ |
| 6 | $-\dfrac{\sqrt{3}}{2} < \dfrac{xvf[i]}{\sqrt{xvf[i]^2 + yvf[i]^2}} < 0$ & $-\dfrac{\sqrt{3}}{2} < \dfrac{yvf[i]}{\sqrt{xvf[i]^2 + yvf[i]^2}} < 0$ |
| 7 | $-\dfrac{\sqrt{3}}{2} \geq \dfrac{yvf[i]}{\sqrt{xvf[i]^2 + yvf[i]^2}}$ |
| 8 | $\dfrac{\sqrt{3}}{2} > \dfrac{xvf[i]}{\sqrt{xvf[i]^2 + yvf[i]^2}} > 0$ & $-\dfrac{\sqrt{3}}{2} < \dfrac{yvf[i]}{\sqrt{xvf[i]^2 + yvf[i]^2}} < 0$ |

FIG. 10

| MOTION FEATURE | JUDGEMENT CODE | TIME | POSITION TO SEGMENT |
|---|---|---|---|
| TIP OF CHIN WHEN NODDING | 7-(0)-3 | | LOWEST POINT AMONG Y-COORDINATES |
| BLINKING | 1-0-2 | | POINT WHERE EYE REGION BECOMES INVISIBLE |
| CHANGE IN SHAPE OF MOUTH | 1 | | STARTING AND ENDING POINTS OF CHANGE |
| STOP GESTURE | 0 | 5 | STARTING POINT OF STOPPING GESTURE |
| TOUCHING FACE WITH HAND(S) | 0 | 5 | STARTING AND ENDING POINTS OF TOUCHING |
| POINT WHERE EFFECTIVENESS OF HANDS CHANGES | * | | POINT WHERE CODE CHANGES |

Columns: 1001, 1002, 1003, 1004

FIG. 11

| CODE NUMBER | 7 | 1101 |
|---|---|---|
| CODE START FRAME NUMBER | 10 | 1102 |
| CODE END FRAME NUMBER | 14 | 1103 |

| NUMBER OF EYES | 2 | 1301 |
| AREA OF FIRST EYE | 32 | 1302 |
| AREA OF SECOND EYE | 30 | 1303 |

FIG. 14

| MOVEMENT CODE | CONDITION |
|---|---|
| 0 | s1_eye[i]<α & s2_eye[i]<α |
| 1 | s1_eye[i]>α & s2_eye[i]>α <br> d1_eye[i]<-β & d2_eye[i]<-β |
| 2 | s1_eye[i]>α & s2_eye[i]>α <br> d1_eye[i]>β & d2_eye[i]>β |
| 3 | (s1_eye[i]<α & s2_eye[i]>α) or (s1_eye[i]<α & s2_eye[i]>α) |
| 4 | s1_eye[i]>α & s2_eye[i]>α <br> (d1_eye[i]<-β & -β≤d2_eye[i]≤β) or (-β≤d1_eye[i]≤β & d2_eye[i]<-β) |
| 5 | s1_eye[i]>α & s2_eye[i]>α <br> (d1_eye[i]>β & -β≤d2_eye[i]≤β) or (-β≤d1_eye[i]≤β & d2_eye[i]>β) |
| 6 | s1_eye[i]>α & s2_eye[i]>α <br> -β≤d1_eye[i]≤β & -β≤d2_eye[i]≤β |

FIG. 15

| AREA OF MOUTH | 74 | 1501 |
|---|---|---|
| VERTICAL MAXIMUM LENGTH OF MOUTH | 5 | 1502 |

FIG. 16

| MOVEMENT CODE (1601) | CONDITION (1602) |
|---|---|
| 0 | $|d\_mouth[i]| \leq \gamma$ & $|y\_mouth[i]| \leq \lambda$ |
| 1 | $|d\_mouth[i]| > \gamma$ & $|y\_mouth[i]| > \lambda$ |

FIG. 17

| NUMBER OF HANDS | 2 | 1701 |
|---|---|---|
| BARYCENTRIC COORDINATES OF FIRST HAND | (280, 382) | 1702 |
| AREA OF FIRST HAND | 1501 | 1703 |
| BARYCENTRIC COORDINATES OF SECOND HAND | (335, 391) | 1704 |
| AREA OF SECOND HAND | 1508 | 1705 |

FIG. 18

| MOVEMENT CODE | CONDITION |
|---|---|
| 0 | $|m1\_hand[i]| \leq \chi$ & $|d1\_hand[i]| \leq \delta$ & $|m2\_hand[i]| \leq \chi$ & $|d2\_hand[i]| \leq \delta$ & $|m\_body[i]| \leq \varepsilon$ |
| 1 | $|m1\_hand[i]| > \chi$ or $|d1\_hand[i]| > \delta$   $|m2\_hand[i]| > \chi$ or $|d2\_hand[i]| > \delta$ or $|m\_body[i]| > \varepsilon$ |

FIG. 19

| MOVEMENT CODE | CONDITION |
|---|---|
| 0 | $|l1\_hand[i]| \leq \omega$ or $|l2\_hand[i]| \leq \omega$ |
| 1 | $|l1\_hand[i]| > \omega$ or $|l2\_hand[i]| > \omega$ |

FIG. 20

| MOVEMENT CODE | CONDITION |
|---|---|
| 0 | sp1_hand[i]=6 & sp2_hand[i]=6 |
| 1 | (sp1_hand[i]=6 & sp2_hand[i]≠6 & m2_hand[i]<x) or (sp1_hand[i]≠6 & m1_hand[i]<x & sp2_hand[i]=6) |
| 2 | (sp1_hand[i]=6 & sp2_hand[i]≠6 & m2_hand[i]>x) or (sp1_hand[i]≠6 & m1_hand[i]>x & sp2_hand[i]=6) |
| 3 | sp1_hand[i]≠6 & m1_hand[i]<x & sp2_hand[i]≠6 & m2_hand[i]<x |
| 4 | (sp1_hand[i]≠6 & m1_hand[i]>x & sp2_hand[i]≠6 & m2_hand[i]<x) or (sp1_hand[i]≠6 & m1_hand[i]<x & sp2_hand[i]≠6 & m2_hand[i]>x) |
| 5 | sp1_hand[i]≠6 & m1_hand[i]>x & sp2_hand[i]≠6 & m2_hand[i]>x |

FIG. 25

| BODY FEATURE (2501) | NON-SEGMENT MOTION FEATURE (2502) |
|---|---|
| HAND REGION | BRINGING HANDS CLOSER TO EACH OTHER |
| MOUTH | CHANGE IN SHAPE OF MOUTH |

FIG. 26

| NON-SEGMENT MOTION FEATURE (2601) | JUDGEMENT CODE (2602) | TIME (2603) |
|---|---|---|
| BRINGING HANDS CLOSER TO EACH OTHER | 1 | |
| CHANGE IN SHAPE OF MOUTH | 1 | |

FIG. 27

| MOVEMENT CODE | CONDITION |
|---|---|
| 0 | $dvh[n][i] < \alpha\_dv$ |
| 1 | $\frac{\sqrt{3}}{2} \leq \frac{Xvh[n][i]}{\sqrt{Xvh[n][i]^2 + Yvh[n][i]^2}}$ |
| 2 | $\frac{\sqrt{3}}{2} > \frac{Xvh[n][i]}{\sqrt{Xvh[n][i]^2 + Yvh[n][i]^2}} > 0$ & $\frac{\sqrt{3}}{2} > \frac{Yvh[n][i]}{\sqrt{Xvh[n][i]^2 + Yvh[n][i]^2}} > 0$ |
| 3 | $\frac{\sqrt{3}}{2} \leq \frac{Yvh[n][i]}{\sqrt{Xvh[n][i]^2 + Yvh[n][i]^2}}$ |
| 4 | $-\frac{\sqrt{3}}{2} < \frac{Xvh[n][i]}{\sqrt{Xvh[n][i]^2 + Yvh[n][i]^2}} < 0$ & $\frac{\sqrt{3}}{2} > \frac{Yvh[n][i]}{\sqrt{Xvh[n][i]^2 + Yvh[n][i]^2}} > 0$ |
| 5 | $-\frac{\sqrt{3}}{2} \geq \frac{Xvh[n][i]}{\sqrt{Xvh[n][i]^2 + Yvh[n][i]^2}}$ |
| 6 | $-\frac{\sqrt{3}}{2} < \frac{Xvh[n][i]}{\sqrt{Xvh[n][i]^2 + Yvh[n][i]^2}} < 0$ & $\frac{\sqrt{3}}{2} < -\frac{\sqrt{3}}{2} < \frac{Yvh[n][i]}{\sqrt{Xvh[n][i]^2 + Yvh[n][i]^2}} < 0$ |
| 7 | $-\frac{\sqrt{3}}{2} \geq \frac{Yvh[n][i]}{\sqrt{Xvh[n][i]^2 + Yvh[n][i]^2}}$ |
| 8 | $\frac{\sqrt{3}}{2} > \frac{Xvh[n][i]}{\sqrt{Xvh[n][i]^2 + Yvh[n][i]^2}} > 0$ & $-\frac{\sqrt{3}}{2} < \frac{Yvh[n][i]}{\sqrt{Xvh[n][i]^2 + Yvh[n][i]^2}} < 0$ |

FIG. 28

| NUMBER | CONDITION |
|---|---|
| 1 | Ch[1][i]=Ch[2][i] |
| 2 | \|Ch[1][i]-Ch[2][i]\|=4 |
| 3 | Yps[1]=Yps[2] & (Ch[1][i]=2Ch[2][i]=4 \| Ch[1][i]=4Ch[2][i]=2) |
| 4 | Yps[1]=Yps[2] & (Ch[1][i]=6Ch[2][i]=8 \| Ch[1][i]=8Ch[2][i]=6) |
| 5 | Xps[1]=Xps[2] Yps[1]>Yps[2] & (Ch[1][i]=6Ch[2][i]=2 \| Ch[1][i]=8Ch[2][i]=4) |
| 6 | Xps[1]=Xps[2] Yps[1]<Yps[2] & (Ch[1][i]=2Ch[2][i]=6 \| Ch[1][i]=4Ch[2][i]=8) |
| 7 | Xps[1]<Xps[2] Yps[1]>Yps[2] & Ch[1][i]=8Ch[2][i]=2 |
| 8 | Xps[1]<Xps[2] Yps[1]<Yps[2] & Ch[1][i]=2Ch[2][i]=8 |
| 9 | Xps[1]>Xps[2] Yps[1]>Yps[2] & Ch[1][i]=2Ch[2][i]=8 |
| 10 | Xps[1]>Xps[2] Yps[1]<Yps[2] & Ch[1][i]=8Ch[2][i]=2 |

| GESTURE PLANE NUMBER | 3D GESTURE CODE |
|---|---|
| 1 | 0, 1, 2, 3, 4, 5, 6, 7, 8 |
| 2 | 0, 1, 2, 12, 14, 15, 22, 25, 26 |
| 3 | 0, 1, 2, 9, 10, 11, 18, 19, 20 |
| 4 | 0, 1, 2, 13, 16, 17, 21, 23, 24 |
| 5 | 0, 3, 4, 10, 14, 16, 20, 24, 26 |
| 6 | 0, 3, 4, 9, 12, 13, 18, 21, 22 |
| 7 | 0, 3, 4, 11, 15, 17, 19, 23, 25 |
| 8 | 0, 5, 8, 9, 14, 17, 18, 23, 26 |
| 9 | 0, 6, 7, 9, 15, 16, 18, 24, 25 |

| FRAME NUMBER | 20 | 3201 |
|---|---|---|
| STATUS FLAG | 0 | 3202 |

FIG. 33

| FRAME NUMBER | 150 | /3301 |
|---|---|---|
| NUMBER OF NOT-YET-SEGMENTED FRAMES | 20 | /3302 |

FIG. 34

| NUMBER OF CONTROL PARTS | 1 | /3401 |
|---|---|---|
| CONTROL PART | HEAD | /3402 |
| CONTROL GESTURE | NODDING | /3403 |

FIG. 35

| 3501 | 3502 | 3503 | 3504 |
|---|---|---|---|
| RECOGNITION STATUS | NUMBER OF NON-SEGMENT FRAMES | CONTROL PART | CONTROL GESTURE |
| 0 | 100 OR MORE | EYE | BLINKING |
| 0 | | HEAD | NODDING |
| 1 | | HEAD | TILTING HEAD |

| SPEED ADJUSTMENT AMOUNT | CONDITION |
|---|---|
| 0% | flag_rec<d_rec |
| 10% | d_rec≦flag_rec<2d_rec |
| 20% | 2d_rec≦flag_rec<3d_rec |
| 30% | 3d_rec≦flag_rec<4d_rec |
| 40% | 5d_rec≦flag_rec |

METHOD AND DEVICE FOR SEGMENTING HAND GESTURES

BACKGROUND OF THE INVENTION

1. Field of the Invention

The present invention relates to methods and devices for segmenting hand gestures, more specifically to a method and device for automatically segmenting hand gestures for sign language, for example, into words when recognizing the hand gestures.

2. Description of the Background Art

In recent years, pointing devices have allowed for easy input in personal computers, for example, and thus are becoming popular among users not only for professional use because they eliminate complicated keyboard operation.

Further, with the technology of automatically recognizing a user's voice being lately developed, voice-inputting-type personal computers and home electrical appliances equipped with voice-instructing-type microcomputers have appeared on the market (hereinafter, such personal computer or home electrical appliance equipped with a microcomputer is referred to as a computer device). Supposing this technology sees further progress, input operation for the computer device may be approximated to a manner observed in interpersonal communication. Moreover, users who have difficulty in operating with hands may easily access the computer device thanks to the voice-inputting system.

People communicate with each other by moving their hands or heads, or changing facial expressions as well as talking. If the computer device can automatically recognize such motions observed in specific parts of the body, users can handle input operation in a manner rather similar to interpersonal communication. Further, users who see difficulty in operation with voice can easily access the computer device using sign language. The computer device can also be used to translate sign language.

In order to respond to such a request, such a computer device that recognizes the motions observed in the user's specific parts of body, including hand gestures for sign anguage, has been developed by the Assignees of the present invention and others. The processing executed in such a conventional computer device to recognize the hand gestures for sign language is as follows:

First, a user is photographed, then his/her image is stored. Second, a part of the image is specified as a hand(s). Thereafter, motions of the hand(s) are detected, and then any word for sign language matching the detected motions is specified by referring to any dictionary telling how gestures for sign language are made. In this manner, the computer device "recognizes" the user's sign language.

Hereinafter, as to the aforementioned procedure, a process executed to specify words for sign language in accordance with the motions of hands is described in more detail.

Every word for sign language is generally structured by several unit gestures or combinations thereof. The unit gesture herein means a dividable minimum gesture such as raising, lowering, or bending. Assuming that the unit gestures are A, B, and C, words for sign language may be represented in such manner that (A), (B), (C), . . . , (A, B), (A, C), (B, C), . . . , (A, B, C), . . . People talk by sign language by combining these words for sign language.

Supposing that the word for sign language (A) means "power", and the word for sign language (B, C) means "cutting off", a meaning of "cutting off power" is completed by expressing the words for sign language (A) and (B, C), that is, by successively making the unit gestures of A, B, and C.

In face-to-face sign language, when a person who talks by sign language (hereinafter, signer) successively makes the unit gestures A, B, and C with the words for sign language (A) and (B, C) in mind, his/her partner can often intuitively recognize the series of unit gestures being directed to the words for sign language (A) and (B, C). On the other hand, when sign language is inputted into the computer device, the computer device cannot recognize the series of unit gestures A, B, and C as the words for sign language (A) and (B, C) even if the user successively making the unit gestures of A, B, and C with the words for sign language (A) and (B, C) in mind.

Therefore, the user has been taking a predetermined gesture such as a pause (hereinafter, segmentation gesture a) between the words for sign language (A) and (B, C). To be more specific, when the user wants to input "cutting off power", he/she expresses the words for sign language (A) and (B, C) with the segmentation gesture a interposed therebetween, that is, the unit gesture A is first made, then the segmentation gesture a, and the unit gestures B and C are made last. The computer device then detects the series of gestures made by the user, segments the same before and after the segmentation gesture a, and obtains the words for sign language (A) and (B, C).

As is known from the above, in the conventional gesture recognition method executed in the computer device, the user has no choice but to annoyingly insert a segmentation gesture between a hand gesture corresponding to a certain word and a hand gesture corresponding to another that follows every time he/she inputs a sentence structured by several words into the computer device with the hand gestures for sign language. This is because the conventional gesture recognition method could not automatically segment gestures to be detected into words.

Note that, a method of segmenting a series of unit gestures (gesture code string) to be detected into words may include, for example, a process executed in a similar manner to a Japanese word processor in which a character code string is segmented into words, and then converted into characters.

In this case, however, the gesture code string is segmented by referring to any dictionary in which words are registered. Therefore, positions where the gesture code string is segmented are not uniquely defined. If this is the case, the computer device has to offer several alternatives where to segment to the user, and then the user has to select a position best suited to his/her purpose. Accordingly, it gives the user a lot of trouble and, at the same time, makes the input operation slow.

In a case where a dictionary incorporated in the computer device including words for sign language (A), (B), (C), . . . , (A, B), (A, C), (B, C), . . . , (A, B, C), . . . is referred to find a position to segment in the unit gestures A, B and C successively made by the user with the words for sign language (A) and (B, C) in mind, the position to segment cannot be limited to one. Therefore, the computer device segments at some potential positions to offer several alternatives such as (A) and (B, C), (A, B) and (C), or (A, B, C) to the user. In response thereto, the user selects any one which best fits to his/her purpose, and then notifies the selected position to the computer device.

As is evident from the above, such segmentation system based on the gesture code string is not sufficient to automatically segment the series of unit gestures to be detected.

Therefore, an object of the present invention is to provide a hand gesture segmentation method and device for automatically segmenting detected hand gestures into words, when recognizing the hand gestures, without the user's presentation of where to segment.

SUMMARY OF THE INVENTION

A first aspect of the present invention is directed to a method of segmenting hand gestures for automatically segmenting a user's hand gesture into words or apprehensible units structured by a plurality of words when recognizing the user's hand gestures, the method comprising:

previously storing transition feature data including a feature of a transition gesture which is not observed in the user's body during a gesture representing a word but is observed when transiting from a gesture to another;

photographing the user, and storing image data thereof, extracting an image corresponding to a part of body in which the transition gesture is observed from the image data;

detecting a motion of the image corresponding to the part of body in which the transition gesture is observed; and segmenting the hand gesture by comparing the motion of the image corresponding to the part of body in which the transition gesture is observed with the transition feature data, and then finding a time position where the transition gesture is observed.

As described above, in the first aspect, the hand gesture is segmented in accordance with the transition gesture which is not observed in the user's body during gestures representing a word but is observed when transiting from a gesture to another. Therefore, the detected hand gesture can be automatically segmented into words or apprehensible units structured by a plurality of words without the user's presentation of where to segment.

According to a second aspect, in the first aspect, the transition gesture includes blinking.

According to a third aspect, in the first aspect, the transition gesture includes nodding.

According to a fourth aspect, in the first aspect, the transition gesture includes closing a mouth.

According to a fifth aspect, in the first aspect, the transition gesture includes stopping a motion of hand(s).

According to a sixth aspect, in the first aspect, the transition gesture includes stopping a motion of body.

According to a seventh aspect, in the first aspect, the transition gesture includes touching a face with hand(s).

According to an eighth aspect, in the first aspect, the method further comprises setting a meaningless-hand region around the user, in which no hand gesture is considered effective even if the user hand is observed, wherein the transition gesture includes the hand's movement into/out from the meaningless-hand region.

According to a ninth aspect, in the first aspect, in the segmenting the hand gesture, a duration of the transition gesture is measured, and then the hand gesture is segmented in relation to the duration.

As described above, in the ninth aspect, segmentation can be done with improved precision.

According to a tenth aspect, in the first aspect, the method further comprises:

previously storing non-transition feature data including a feature of a non-transition gesture which is not observed in the user's body when transiting from a gesture representing a word to another but is observed during a gesture representing a word;

extracting an image corresponding to a part of body in which the non-transition gesture is observed from the image data;

detecting a motion of the image corresponding to the part of body in which the non-transition gesture is observed; and finding a time position where the non-transition gesture is observed by comparing the motion of the image corresponding to the part of body in which the non-transition gesture is observed with the non-transition feature data, wherein in the segmenting of the hand gesture, the hand gesture is not segmented at the time position where the non-transition gesture is observed.

As described above, in the tenth aspect, the hand gesture is not segmented at the time position where the non-transition gesture is observed, which is a gesture not observed in the user's body during gestures representing a word but is observed when transiting from a gesture to another. Therefore, erroneous segmentation of words can be prevented, and thus precision for the segmentation can be improved.

According to a eleventh aspect, in the tenth aspect, the non-transition gesture includes bringing hands closer to each other than a value predetermined for a distance therebetween.

According to a twelfth aspect, in the tenth aspect, the non-transition gesture includes changing the shape of the mouth.

According to a thirteenth aspect, in the tenth aspect, the non-transition gesture includes a motion of moving a right hand symmetrical to a left hand, and vice-versa.

According to a fourteenth aspect, in the thirteenth aspect, in the photographing of the user and storing image data thereof, the user is stereoscopically photographed and 3D image data thereof is stored, in the extracting, a 3D image corresponding to the part of body in which the non-transition gesture is observed is extracted from the 3D image data, in the detecting, a motion of the 3D image is detected, and in the time position finding, changes in a gesture plane for the right hand and a gesture plane for the left hand are detected in accordance with the motion of the 3D image, and when neither of the gesture planes shows a change, the non-transition gesture is determined as being observed, and a time position thereof is then found.

According to a fifteenth aspect, in the fourteenth aspect, in the time position finding, the changes in the gesture plane for the right hand and the gesture plane for the left hand are detected in accordance with a change in a normal vector to the gesture planes.

According to a sixteenth aspect, in the fourteenth aspect, the method further comprising previously generating, as to a plurality of 3D gesture codes corresponding to a 3D vector whose direction is varying, a single-motion plane table in which a combination of the 3D gesture codes found in a single plane is included; and converting the motion of the 3D image into a 3D gesture code string represented by the plurality of 3D gesture codes, wherein in the time position finding, the changes in the gesture plane for the right hand and the gesture plane for the left hand are detected in accordance with the single-motion plane table.

According to a seventeenth aspect, in the first aspect, the method further comprising:

previously storing image data of an animation representing the transition gesture;

detecting a status of the transition gesture's detection and a status of the hand gesture's recognition; and visually displaying the animation representing the transition gesture to the user in relation to the status of the transition gesture's detection and the status of the hand gesture's recognition.

As described above, in the seventeenth aspect, when detection frequency of a certain transition gesture is considerably low, or when a hand gesture is failed to be recognized even though the hand gesture was segmented according to the detected transition gesture, the animation representing the transition gesture is displayed. Therefore, the user can intentionally correct his/her transition gesture while referring to the displayed animation, and accordingly the transition gesture can be detected in a precise manner.

According to an eighteenth aspect, in the seventeenth aspect, in the animation displaying, a speed of the animation is changed in accordance with the status of the hand gesture's recognition.

As described above, in the eighteenth aspect, when the status of hand gesture's recognition is not correct enough, the speed of the animation to be displayed will be lowered. Thereafter, the user will be guided to make his/her transition gesture in a slower manner. In this manner, the status of hand gesture's recognition can thus be improved.

A nineteenth aspect of the present invention is directed to a recording medium storing a program to be executed in a computer device including a method of automatically segmenting a user's hand gestures into words or apprehensible units structured by a plurality of words, the program being for realizing an operational environment including:

previously storing transition feature data including a feature of a transition gesture which is not observed in the user's body during a gesture representing a word but is observed when transiting from a gesture to another;

photographing the user, and storing image data thereof;

extracting an image corresponding to a part of body in which the transition gesture is observed from the image data;

detecting a motion of the image corresponding to the part of body in which the transition gesture is observed; and segmenting the hand gesture by comparing the motion of the image corresponding to the part of body in which the transition gesture is observed with the transition feature data, and then finding a time position where the transition gesture is observed.

According to a twentieth aspect, in the nineteenth aspect, the program further comprises:

previously storing non-transition feature data including a feature of a non-transition gesture which is not observed in the user's body when transiting from a gesture representing a word to another but is observed during a gesture representing a word;

extracting an image corresponding to a part of body in which the non-transition gesture is observed from the image data;

detecting a motion of the image corresponding to the part of body in which the non-transition gesture is observed; and finding a time position where the non-transition gesture is observed by comparing the motion of the image corresponding to the part of body in which the non-transition gesture is observed with the non-transition feature data, wherein in the segmenting of the hand gesture, the hand gesture is not segmented at the time position where the non-transition gesture is observed.

According to a twenty-first aspect, in the nineteenth aspect, the program further comprises:

previously storing image data of an animation representing the transition gesture;

detecting a status of the transition gesture's detection and a status of the hand gesture's recognition; and visually displaying the animation representing the transition gesture to the user in relation to the status of the transition gesture's detection and the status of the hand gesture's recognition.

A twenty-second aspect of the present invention is directed to a hand gesture segmentation device for automatically segmenting a user's hand gestures into words or apprehensible units structured by a plurality of words when recognizing the user's hand gestures, the device comprising:

means for storing transition feature data including a feature of a transition gesture which is not observed in the user's body during a gesture representing a word but is observed when transiting from a gesture to another;

means for photographing the user, and storing image data thereof;

means for extracting an image corresponding to a part of body in which the transition gesture is observed from the image data;

means for detecting a motion of the image corresponding to the part of body in which the transition gesture is observed; and means for segmenting the hand gesture by comparing the motion of the image corresponding to the part of body in which the transition gesture is observed with the transition feature data, and then finding a time position where the transition gesture is observed.

According to a twenty-third aspect, in the twenty-second aspect, the hand gesture segmentation device further comprises:

means for storing non-transition feature data including a feature of a non-transition gesture which is not observed in the user's body when transiting from a gesture representing a word to another but is observed during a gesture representing a word;

means for extracting an image corresponding to a part of body in which the non-transition gesture is observed from the image data;

means for detecting a motion of the image corresponding to the part of body in which the non-transition gesture is observed; and means for finding a time position where the non-transition gesture is observed by comparing the motion of the image corresponding to the part of body in which the non-transition gesture is observed with the non-transition feature data, wherein the means for segmenting the hand gesture does not execute segmentation with respect to the hand gesture at the time position where the non-transition gesture is observed.

A twenty-fourth aspect of the present invention is directed to a motion induction device being incorporated in a hand gesture recognition device for recognizing a user's hand gestures, and in a hand gesture segmentation device for automatically segmenting the hand gestures into words or apprehensible units structured by a plurality of words to visually guide the user to have him/her make a predetermined gesture, the hand gesture segmentation device including a function of detecting a transition gesture which is not observed in the user's body during a gesture representing a word but is observed when transiting from a gesture to another, and then segmenting the hand gesture, wherein the motion induction device comprises:

means for previously storing image data of an animation representing the transition gesture;

means for detecting a status of the transition gesture's detection and a status of the hand gesture's recognition by monitoring the hand gesture segmentation device and the hand gesture recognition device; and means for visually displaying the animation representing the transition gesture to the user in relation to the status of the transition gesture's detection and the status of the hand gesture's recognition.

According to a twenty-fifth aspect, in the twenty-fourth aspect, the animation displaying means includes means for changing a speed of the animation according to the status of the hand gesture's recognition.

A twenty-sixth aspect of the present invention is directed to a hand gesture segmentation device for automatically segmenting a user's hand gestures into words or apprehensible units structured by a plurality of words when recognizing the user's hand gestures, the device comprising:

means for storing transition feature data including a feature of a transition gesture which is not observed in the user's body during a gesture representing a word but is observed when transiting from a gesture to another;

means for photographing the user with a camera placed in a position opposing to the user, and storing image data thereof;

means for extracting an image corresponding to a part of body in which the transition gesture is observed from the image data;

means for detecting a motion of the image corresponding to the part of body in which the transition gesture is observed;

means for segmenting the hand gesture by comparing the motion of the image corresponding to the part of body in which the transition gesture is observed with the transition feature data, and then finding a time position where the transition gesture is observed;

means for visually displaying the animation representing the transition gesture to the user in relation to the status of the transition gesture's detection and the status of the hand gesture's recognition; and means for concealing the camera from the user's view.

As described above, in the twenty-sixth aspect, the camera is invisible from the user's view. Therefore, the user may not become self-conscious and get nervous when making his/her hand gestures. Accordingly, the segmentation can be done in a precise manner.

According to a twenty-seventh aspect, in the twenty-sixth aspect, the animation displaying means includes an upward-facing monitor placed in a vertically lower position from a straight line between the user and the camera, and the means for concealing the camera includes a half mirror which allows light coming from forward direction to pass through, and reflect light coming from reverse direction, wherein the half mirror is placed on the straight line between the user and the camera, and also in a vertically upper position from the monitor where an angle of 45 degrees is obtained with respect to the straight line.

As described above, in the twenty-seventh aspect, the camera can be concealed in a simple structure.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing conditions of facial feature movements for a feature movement tracking part 303 to determine a feature movement code.

FIG. 10 is a diagram exemplarily showing a motion feature parameter set to a motion feature 602.

FIG. 11 is a diagram exemplarily showing determination code data generated by a segment position determination part 304.

FIG. 14 is a diagram showing conditions of feature movements for eyes for the feature movement tracking part 303 to determine the feature movement code.

FIG. 15 is a diagram exemplarily showing mouth region information generated by the body feature extraction part 302.

FIG. 16 is a diagram showing conditions of feature movements for mouth for the feature movement tracking part 303 to determine the feature movement code.

FIG. 17 is a diagram exemplarily showing hand region information generated by the body feature extraction part 302.

FIG. 18 is a diagram showing conditions of feature movements for body and hand region for the feature movement tracking part 303 to determine the feature movement code.

FIG. 19 is a diagram showing conditions of feature movements for a gesture of touching face with hand(s) for the feature movement tracking part 303 to determine the feature movement code.

FIG. 20 is a diagram showing conditions of feature movements for a change in effectiveness of hands for the feature movement tracking part 303 to determine the feature movement code.

FIG. 25 is a diagram exemplarily showing non-segment element data stored in a non-segment element storage part 2201.

FIG. 26 is a diagram exemplarily showing non-segment motion feature parameters set to a non-segment motion feature 2502.

FIG. 27 is a diagram showing conditions of non-segment feature movements for symmetry of sign language gestures for the feature movement tracking part 303 to determine the feature movement code.

FIG. 28 is a diagram exemplarily showing conditions of non-segment codes for symmetry of sign language gestures stored in the non-segment element storage part 2201.

FIG. 33 is a diagram exemplarily showing segmentation status information inputted into the segment result input part 3002.

FIG. 34 is a diagram exemplarily showing inductive control information generated by the inductive control information generating part 3003.

FIG. 35 is a diagram exemplarily showing an inductive rule stored in the inductive rule storage part 3005.

DESCRIPTION OF THE PREFERRED EMBODIMENTS

The embodiments of the present invention are described next below with reference to the accompanying drawings.

First Embodiment

Figure 1:
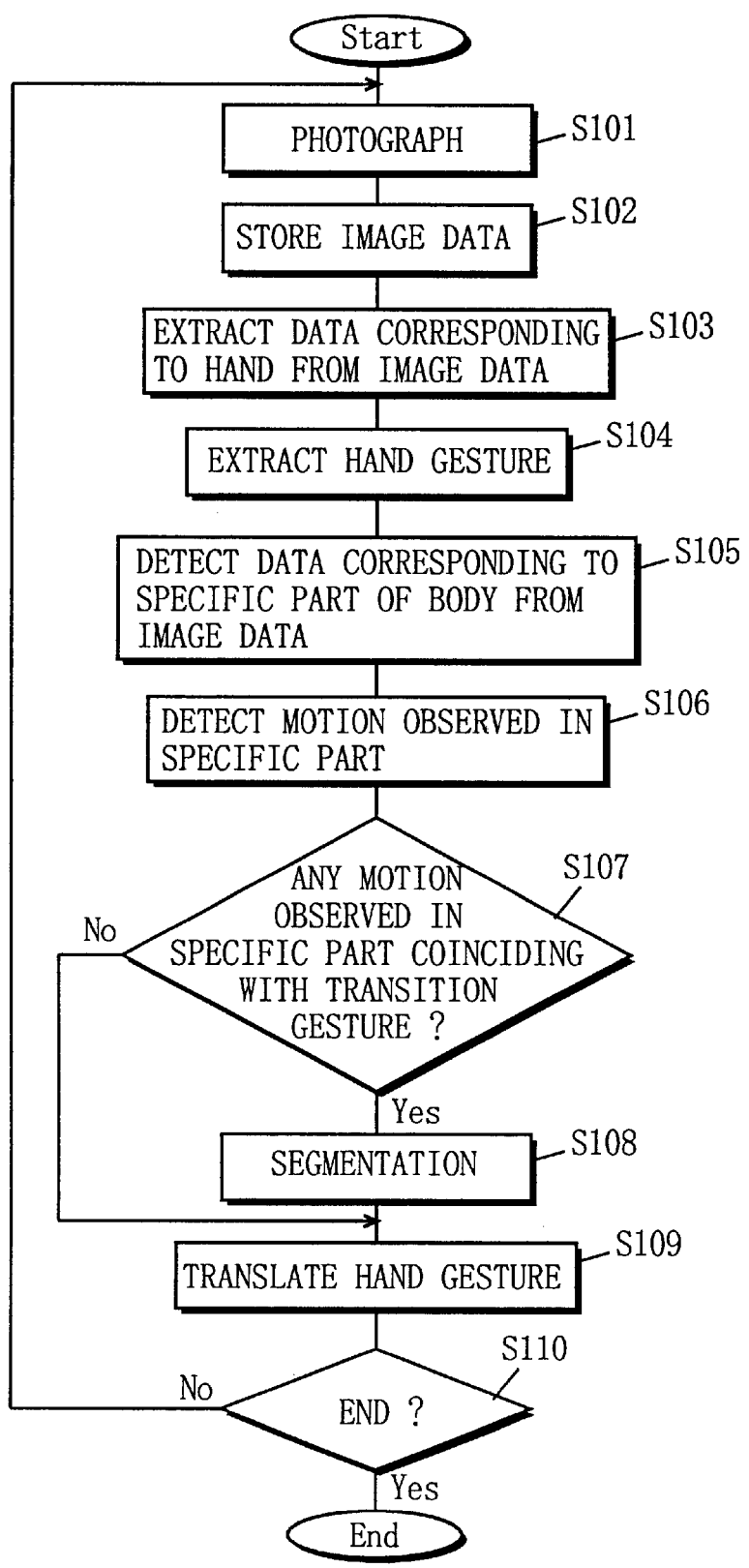
FIG. 1 is a flowchart for a hand gesture recognition method utilizing a method of segmenting hand gestures according to a first embodiment of the present invention.
Figure 2:
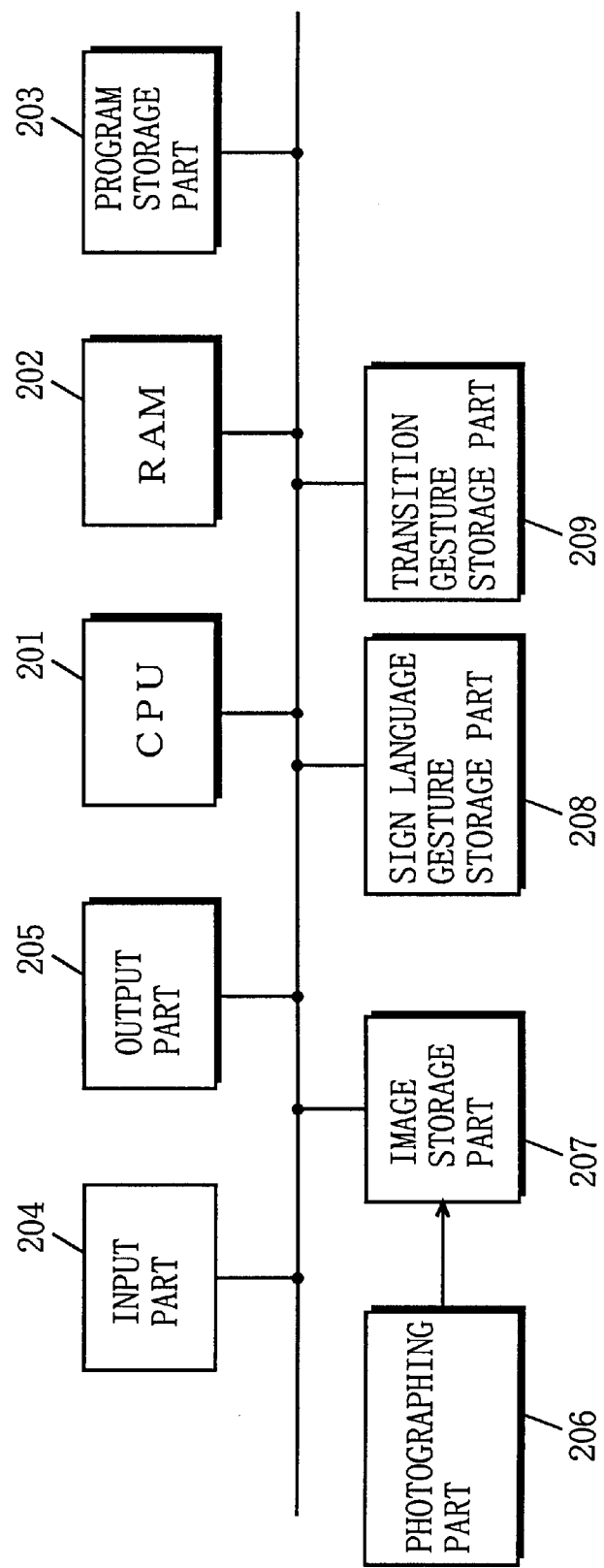
FIG. 2 is a block diagram exemplarily showing the structure of a computer device which realizes the method illustrated in FIG. 1.

FIG. 1 is a flowchart for a hand gesture recognition method utilizing a method of segmenting hand gestures according to a first embodiment of the present invention. FIG. 2 is a block diagram showing an exemplary structure of a computer device which realizes the method illustrated in FIG. 1.

In FIG. 2, the computer device includes a CPU 201, a RAM 202, a program storage part 203, an input part 204, an output part 205, a photographing part 206, an image storage part 207, a sign language hand gesture storage part 208, and a transition gesture storage part 209.

The computer device in FIG. 2 first recognizes a user's (subject's) hand gestures for sign language, and then executes a predetermined process. Specifically, such computer device is assumed to be a general-purpose personal computer system in which predetermined program data is installed and a camera is connected so as to realize input and automatic translation of sign language. The computer device may include any household electrical appliance equipped with a microcomputer for turning on/off a power supply or selecting operational modes responding to the user's hand gestures.

The hand gesture recognition method in FIG. 1 includes hand gesture segmentation processing for segmenting, when recognizing the user's hand gestures, the detected hand gestures into words or apprehensible units structured by a plurality of words.

Herein, the present invention is summarized as follows for the sake of clarity.

As is described in the Background Art, in communicating by sign language, several pieces of words for sign language are generally used to compose a sentence. Every word for sign language is structured by combining one or more unit gestures. On the other hand, the computer device detects the user's hand gestures as a series of unit gestures. Therefore, in order to make the computer device recognize the hand gestures, it is required, in some way, to segment the series of unit gestures into words as was intended by the user.

In the conventional segmentation method, the user takes a pause between a gesture corresponding to a certain word and a gesture corresponding to another that follows, while the computer device detects such pause so that the series of unit gestures are segmented. In other words, the user is expected to indicate where to segment.

When people talk by sign language face to face, the words are successively expressed. Inventors of the present invention have noticed that a person talking by sign language unconsciously moves in a certain manner between a gesture corresponding to a certain word and a gesture corresponding to another that follows, such as blinking, closing his/her mouth or nodding (hereinafter, any gesture unconsciously made by the user between words is referred to as a transition gesture). The transition gesture also includes any pause spontaneously taken between words. Such transition gesture is barely observed during hand gestures corresponding to a single word. Therefore, the inventors of the present invention have proposed to utilize the transition gesture for segmenting the hand gestures.

Specifically, in the method in FIG. 1, the computer device concurrently detects the transition gesture when detecting the user's hand gestures for sign language. Thereafter, the computer device finds a time position where the transition gesture is observed so that the hand gestures (that is, a series of unit gestures) are segmented into words or comprehensible units. Consequently, unlike the conventional segmentation method, the user does not need to indicate where to segment.

Referring back to FIG. 2, the program storage part 203 includes program data for realizing the processing illustrated by the flowchart in FIG. 1. The CPU 201 executes the processing illustrated in FIG. 1 in accordance with the program data stored in the program storage part 203. The RAM 202 stores data necessary for processing in the CPU 201 or work data to be generated in the processing, for example.

The input part 204 includes a keyboard or a mouse, and inputs various types of instructions and data into the CPU 201 responding to an operator's operation. The output part 205 includes a display or a signer, and outputs the processing result of the CPU 201, and the like in the form of video or audio.

The photographing part 206 includes at least one camera, and photographs the user's gestures. One camera is sufficient for a case where the user's gestures are two-dimensionally captured, but is not sufficient for a three-dimensional case. In such a case, two cameras are required.

The image storage part 207 stores images outputted from the photographing part 206 for a plurality of frames. The sign language hand gesture storage part 208 includes sign language feature data telling features of hand gestures for sign language. The transition gesture storage part 209 includes transition feature data telling features of transition gesture.

The following three methods are considered to store program data in the program storage part 203. In a first method, program data is read from a recording medium in which the program data was previously stored, and then is stored in the program storage part 203. In a second method, program data transmitted over a communications circuit is received, and then is stored in the program storage part 203. In a third method, program data is stored in the program storage part 203 in advance before the computer device's shipment.

Note that the sign language feature data and the transition feature data can be both stored in the sign language hand gesture storage part 208 and the transition gesture storage part 209, respectively, in a similar manner to the above first to third methods.

Hereinafter, a description will be made on how the computer device structured in the aforementioned manner is operated by referring to the flowchart in FIG. 1.

First of all, the photographing part 206 starts to photograph a user (step S101). Image data outputted from the photographing part 206 is stored in the image storage part 207 at predetermined sampling intervals (for example, 1/30 sec) (step S102). Individual frames of the image data stored in the image storage part 207 are serially numbered (frame number) in a time series manner.

Second, the CPU 201 extracts data corresponding to the user's hands respectively from the frames of the image data stored in the image storage part 207 in step S102 (step S103). Then, the CPU 201 detects motions of the user's hands in accordance with the data extracted in step S103 (step S104). These steps S103 and S104 will be described in more detail later.

Thereafter, the CPU 201 extracts data corresponding to the user's specific part of body from the image data stored in the image storage part 207 in step S102 (step S105). In this example, the specific part includes, for example, eyes, mouth, face (outline) and body, where the aforementioned transition gesture is observed. In step S105, data corresponding to at least a specific part, preferably to a plurality thereof, is extracted. In this example, data corresponding to eyes, mouth, face and body is assumed to be extracted.

Next, the CPU 201 detects motions of the respective parts in accordance with the data extracted in step S105 (step S106). The transition gesture is observed in the hands as well as eyes, mouth, face or body. Note that, for motions of the hands, the result detected in step S104 is applied.

Hereinafter, it will be described in detail how data is extracted in steps S103 and S105, and how motions are detected in steps S104 and S106.

Data is exemplarily extracted as follows in steps S103 and S105.

First of all, the CPU 201 divides the image data stored in the image storage part 207 into a plurality of regions to which the user's body parts respectively correspond. In this example, the image data are divided into three regions: a hand region including hands; a face region including a face; and a body region including a body. This region division is exemplarily done as follows.

The user inputs a color of a part to be extracted into the CPU 201 through the input part 204. In detail, the color of hand (beige, for example) is inputted in step S103, while the color of the whites of eyes (white, for example), the color of lips (dark red, for example), the color of face (beige, for example) and the color of clothes (blue, for example) are inputted in step S105.

In response thereto, the CPU 201 refers to a plurality of pixel data constituting the image data in the respective regions, and then judges whether or not each color indicated by the pixel data is identical or similar to the color designated by the user, and then selects only the pixel data judged as being positive.

In other words, in step S103, only the data indicating beige is selected out of pixel data belonging to the hand region. Therefore, in this manner, the data corresponding to the hands can be extracted.

In step S105, only the data indicating white is selected out of the face region. Therefore, the data corresponding to the eyes (whites thereof) can be extracted. Similarly, as only the data indicating dark red is selected out of the face region, the data corresponding to the mouth (lips) can be extracted. Further, as only the data indicating beige is selected out of the face region, the data corresponding to the face can be extracted. Still further, as only the data indicating blue is selected out of the body region, the data corresponding to the body (clothes) can be extracted.

Motions are detected as follows in step S104.

The CPU 201 compares the data extracted from the respective frames in step S103 so as to detect motions of the hands in the respective frames. Thereafter, the CPU 201 encodes the detected motions by following a predetermined procedure.

Accordingly, the motions of the hands detected in step S104 are in the form of a code string each structured by a plurality of gesture codes predetermined for hands. The gesture code strings are temporarily stored in the RAM 202.

Motions are detected as follows in step S106.

The CPU 201 compares the data extracted from the respective frames in step S105 so as to detect motions of the eyes, mouth, face and body in the respective frames. Thereafter, the CPU 201 encodes the detected motions by following a predetermined procedure.

Accordingly, the motions of the respective parts (eyes, mouth, face and body) detected in step S106 are in the form of a code string each structured by a plurality of gesture codes predetermined for the parts. The gesture code strings are temporarily stored in the RAM 202.

Referring back to FIG. 2, processing to be executed from step S107 and onward is described.

The CPU 201 reads the transition feature data from the transition gesture storage part 209 so as to compare the same with the motions of the respective parts detected in step S106. At this stage, the transition feature data is described with the plurality of gesture codes used in steps S104 and S106 to represent the motions of the user's parts of body. Thereafter, the CPU 201 judges whether or not any motion of the respective parts (eyes, mouth, face or body) is identical or similar to the transition gesture (blinking, closing a mouth, nodding, or stopping the motion of hands or body) (step S107).

In detail, the CPU 201 searches for the gesture code strings of the respective parts stored in the RAM 202, then judges whether or not any gesture code string is identical or similar to the gesture codes or gesture code strings of the transition feature data.

When the judgement made in step S107 is negative, the procedure advances to step S109.

When the judgement made in step S107 is positive, the CPU 201 determines a position where the hand gestures detected in step S104 are segmented into words (step S108). This processing for determining the position to segment is executed as follows.

First, the CPU 201 selects any motion of the respective parts identical or similar to the transition gesture for a potential position to segment. Specifically, the CPU 201 searches for the gesture code strings of the respective parts stored in the RAM 202, detects any gesture code string identical or similar to the gesture codes or gesture code strings of the transition feature data, and then specifies each time position thereof with frame number. The time position specified in such manner is hereinafter referred to as a potential position to segment.

Next, the CPU 201 compares the potential positions to segment selected for the respective parts with each other in the aforementioned manner, then determines where to segment the hand gestures (a series of unit gestures) detected in step S104 by referring to the comparison.

By taking blinking as an example, the moment when the eyelids are lowered (in other words, the moment when the whites of the eyes become invisible) is regarded as the potential position to segment. As to a motion of closing a mouth, the moment when the lips are shut is considered to be the potential position. As to nodding, the moment when the lower end of the face changes its movement from downward to upward (the moment when the tip of the chin reaches at the lowest point) is regarded as the potential position. As to stopping the motion of hands, for example, the moment when the hands stop moving is regarded as the potential position. As to stopping the motion of body, for example, the moment when the body stops moving is regarded as the potential position.

After these potential positions selected for the respective parts are compared with each other, when two or more potential positions are in the same position or closer than a predetermined interval, the CPU 201 determines the position as the position to segment. More specifically, when two or more potential positions are in the same position, the position is regarded as the position to segment. When two or more potential positions are closer to each other, a mean position thereof is regarded as the position to segment (or any one position thereof may be regarded as the position to segment).

In step S109, processing for translating the hand gestures detected in step S104 is executed by referring to the position to segment determined in step S108.

Specifically, the CPU 201 segments the hand gestures detected in step S104 at the position to segment determined in step S108, then translates words for sign language obtained thereby while comparing the same with the sign language feature data stored in the sign language hand gesture storage part 208. In this example, the sign language feature data is described with the plurality of gesture codes used in step S104 to make the hand gestures.

Thereafter, the CPU 201 determines whether or not to terminate the operation (step S110). If the determination is negative, the processing executed in step S101 and thereafter is repeated. If positive, the operation is terminated.

As is known from the above, according to this embodiment, the hand gestures are segmented in accordance with the transition gesture observed in the user's body when the user transits his/her gestures from a gesture representing a word to a gesture representing another but not during gestures representing a single word. Therefore, without the user's presentation where to segment, the computer device can automatically segment the detected hand gestures into words or apprehensible units constituted by a plurality of words.

While, in the first embodiment, the image data has been divided into three regions of the hand region including hands, the face region including a face, and the body region including a body so as to extract data corresponding to the respective parts of the user's body therefrom, the image data may be divided into four regions in which a meaningless-hand region is additionally included. In this example, the meaningless-hand region is equivalent to a bottom part of a screen of the output part 205 in which the user's hands are placed with his/her arms lowered.

As long as the hands are observed in the meaningless-hand region, the computer device judges that the user is not talking by sign language. Conversely, the moment when the hands gets out of the meaningless-hand region, the computer device judges that hand gestures have started. In this manner, the computer device thus can correctly recognize when the user starts to make hand gestures. Moreover, the computer device may be set to detect the hands' movement into/out from the meaningless-hand region as the transition gesture to utilize the same for segmentation.

While at least one of the motions such as blinking, closing a mouth, nodding, stopping the motion of hands or body have(has) been detected as the transition gesture for determining where to segment in the first embodiment, the transition gesture is not limited thereto. For example, a motion of touching face with hand(s) may be regarded as the transition gesture. This is because, in sign language, gestures such as bringing hand(s) closer to face or moving hand(s) away from face are often observed at the head of a word or at the end thereof.

Further, to determine the position to segment, duration of the transition gesture may be considered in the first embodiment. For example, the duration for which the hands do not move is compared with a predetermined threshold value. If the duration is longer than the threshold value, it is determined as the transition gesture, and is utilized to determine the position to segment. If the duration is shorter than the threshold value, it fails to be determined as the transition gesture and thus is disregarded. In this manner, segmentation can be done with improved precision.

Still further, in the first embodiment, a non-transition gesture is stored as well as the transition gesture so as to determine the position to segment in accordance therewith. Herein, the non-transition gesture means a gesture which is not observed in the user's body when transiting from a gesture representing a word to another, but is observed during a gesture representing a word. The non-transition gesture may include a gesture of bringing hands closer to each other, or a gesture of changing the shape of a mouth, for example.

In detail, the computer device in FIG. 2 is further provided with a non-transition gesture storage part (not shown), and non-transition feature data indicating features of the non-transition gesture is stored therein. Thereafter, in step S106 in FIG. 1, both the transition gesture and non-transition gesture are detected. The non-transition gesture can be detected in a similar manner to the transition gesture. Then in step S108, the hand gestures are segmented in accordance with the transition gesture and the non-transition gesture both detected in step S106.

More specifically, in the first embodiment, when the potential positions to segment selected for the respective parts are compared and found that two or more are in the same position or closer than the predetermined interval, the position to segment is determined according thereto (in other words, the coincided position, or a mean position of the neighboring potential positions is determined as being the position to segment). This is not applicable to a case, however, when the non-transition gesture is considered and concurrently detected. That means, for the duration of the non-transition gesture, segmentation is not done even if the transition gesture is detected. In this manner, segmentation can be done with improved precision.

Still further, in the first embodiment, in order to have the computer device detect the transition gesture in a precise manner, animation images for guiding the user to make correct transition gestures (in other words, transition gestures recognizable to the computer device) can be displayed on the screen of the output part 205.

In detail, in the computer device in FIG. 2, animation image data representing each transition gesture is previously stored in an animation storage part (not shown). The CPU 201 then determines which transition gesture should be presented to the user based on the status of the transition gesture detection (detection frequency of a certain transition gesture being considerably low, for example) and the status of hand gestures' recognition whether or not the hand gestures are recognized (after being segmented according to the detected transition gesture). Thereafter, the CPU 201 reads out the animation image data representing the selected transition gesture from the animation storage part so as to output the same to the output part 205. In this manner, the screen of the output part 205 displays animation representing each transition gesture, and the user corrects his/her transition gesture while referring to the displayed animation.

Second Embodiment

Figure 3:
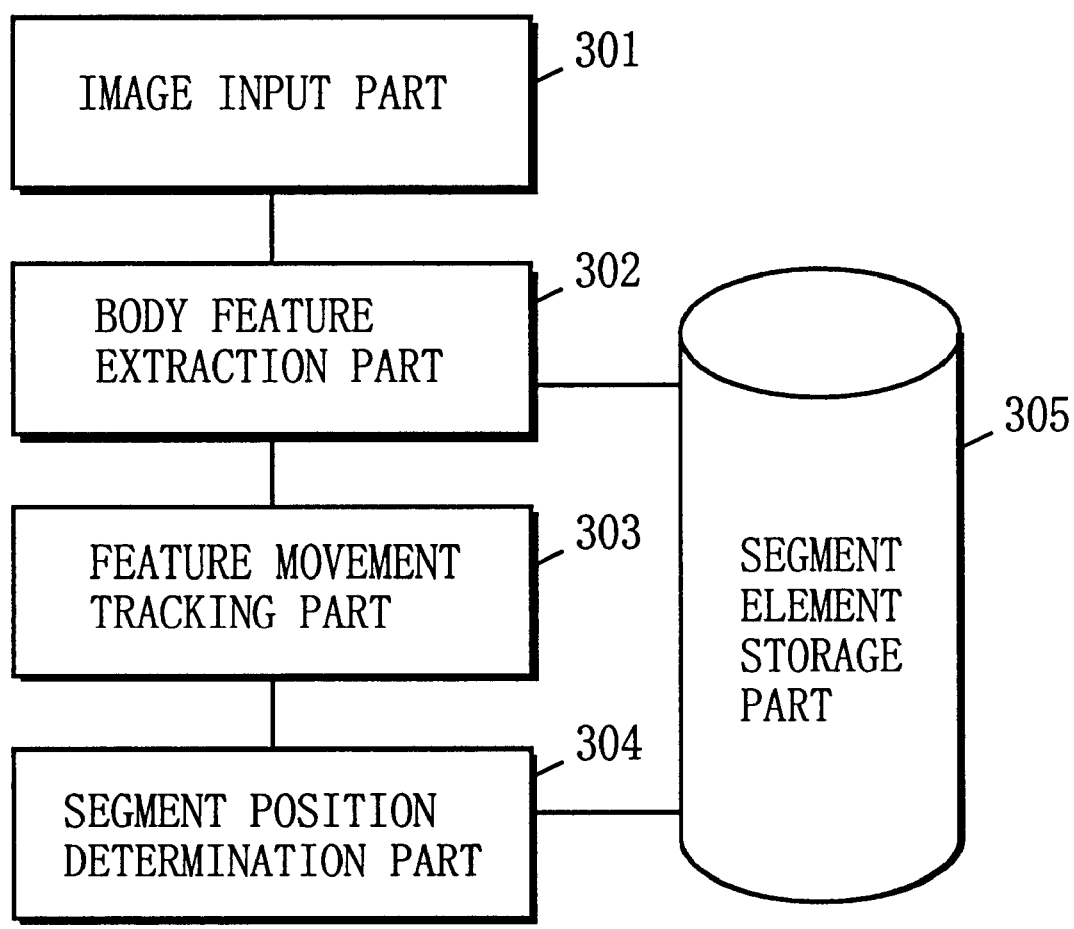
FIG. 3 is a block diagram showing the structure of a sign language gesture segmentation device according to a second embodiment of the present invention.

FIG. 3 is a block diagram showing the structure of a sign language gesture segmentation device according to a second embodiment of the present invention.

In FIG. 3, the sign language gesture segmentation device includes an image input part 301, a body feature extraction part 302, a feature movement tracking part 303, a segment position determination part 304, and a segment element storage part 305.

The sign language gesture segmentation device may be incorporated into a sign language recognition device (not shown), for example. The device may also be incorporated into a computer device such as a home electrical appliance or ticket machine.

The image input part 301 receives images taken in by an image input device such as a camera. In this example, a single image input device is sufficient since a signer's gestures are two-dimensionally captured unless otherwise specified.

The image input part 301 receives the signer's body images. The images inputted from the image input part 301 (hereinafter, inputted image) are respectively assigned a number for every frame, then are transmitted to the body feature extraction part 302. The segment element storage part 305 includes previously-stored body features and motion features as elements for segmentation (hereinafter, segment element).

The body feature extraction part 302 extracts images corresponding to the body features stored in the segment element storage part 305 from the inputted images. The feature movement tracking part 303 calculates motions of the body features based on the extracted images, and then transmits motion information indicating the calculation to the segment position determination part 304.

The segment position determination part 304 finds a position to segment in accordance with the transmitted motion information and the motion features stored in the segment element storage part 305, and then outputs a frame number indicating the position to segment.

Herein, the image input part 301, the body feature extraction part 302, the feature movement tracking part 303, and the segment position determination part 304 can be realized with a single or a plurality of computers. The segment element storage part 305 can be realized with a storage device such as hard disk, CD-ROM or DVD connected to the computer.

Hereinafter, a description will be made how the sign language gesture segmentation device structured in the aforementioned manner is operated to execute processing.

Figure 4:
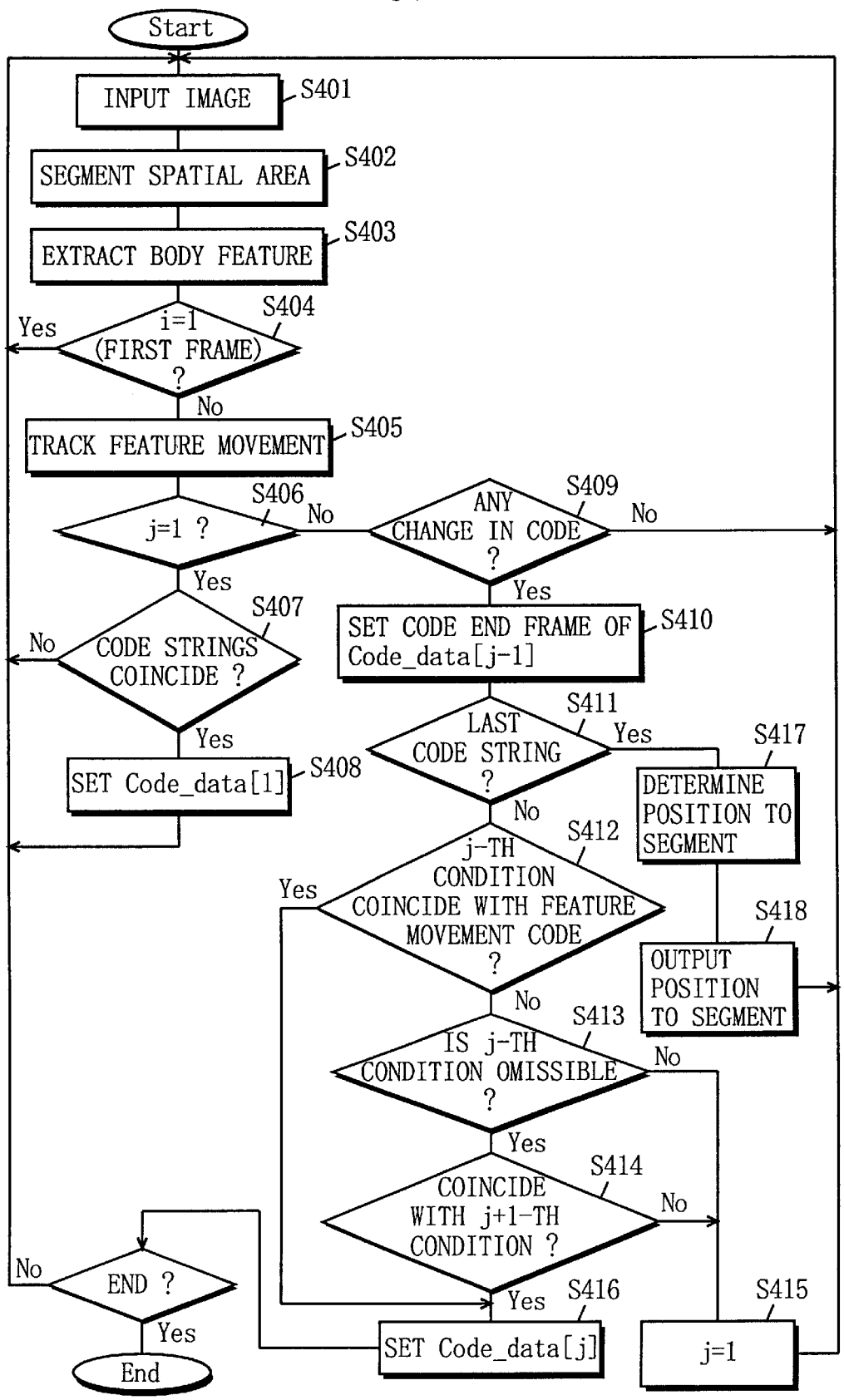
FIG. 4 is a flowchart for an exemplary procedure executed by the sign language gesture segmentation device in FIG. 3.

FIG. 4 shows a flowchart for an exemplary procedure executed by the sign language gesture segmentation device in FIG. 3.

The respective steps shown in FIG. 4 are executed as follows.

[Step S401]

The image input part 301 receives inputted images for a frame, if any. A frame number i is then incremented by "1", and the inputted images are transmitted to the body feature extraction part 302. Thereafter, the procedure goes to step S402.

When there is no inputted images, the frame number i is set to "0" and then a determinationcode number j is set to "1". Thereafter, the procedure repeats step S401.

[Step S402]

The body feature extraction part 302 divides a spatial region according to the signer's body. The spatial region is divided, for example, in a similar manner to the method disclosed in "Method of detecting start position of gestures" (Japanese Patent Laying-Open No. 9-44668).

Specifically, the body feature extraction part 302 first detects a human-body region in accordance with a color difference between background and the signer in the image data, and then divides the spatial region around the signer along an outline of the detected human-body region. Thereafter, a region code is respectively assigned to every region obtained after the division.

Figures 5, 6:
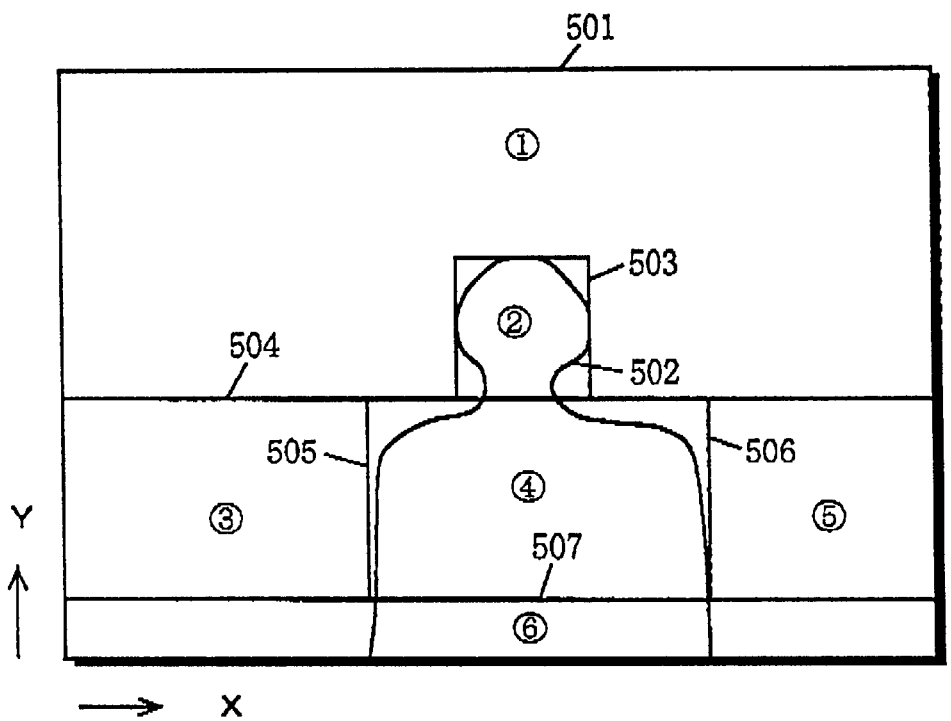
FIG. 5 is a diagram exemplarily showing region codes assigned by a body feature extraction part 302.
FIG. 6 is a diagram exemplarily showing segment element data stored in a segment element storage part 305.

FIG. 5 is a diagram showing exemplary region codes assigned by the body feature extraction part 302.

In FIG. 5, an inputted image 501 (spatial region) is divided by an outline 502 of the human-body region, a head circumscribing rectangle 503, a neck line 504, a body line on the left 505, a body line on the right 506, and a meaningless-hand region decision line 507.

To be more specific, the body feature extraction part 302 first detects a position of the neck by referring to the outline 502 of the human-body region, and draws the neck line 504 at the position of the neck in parallel with the X-axis. Thereafter, the body feature extraction part 302 draws the meaningless-hand decision line 507 in parallel with the X-axis, whose height is equal to a value obtained by multiplying the height of neck line 504 from the bottom of screen by a meaningless-hand decision ratio. The meaningless-hand decision ratio is a parameter used to confirm the hands are effective. Therefore, when the hands are placed below the meaningless-hand decision line 507, the hand gesture in progress at that time is determined as being invalid, that is, the hands are not moving even if the hand gesture is in progress. The meaningless-hand decision ratio is herein set to about ⅕.

Next, every region obtained by the division in the foregoing is assigned the region code. Every number in a circle found in the drawing is the region code. In this embodiment, the region codes are assigned as shown in FIG. 5. To be more specific, a region outside the head circumscribing rectangle 503 and above the neck line 504 is ①, a region inside the head circumscribing rectangle 503 is ②, a region between the neck line 504 and the meaningless-hand decision line 507 located to the left of the body line on the left 505 is ③, a region enclosed with the neck line 504, the meaningless-hand decision line 507, the body line on the left 505 and the body line on the right 506 is ④, a region between the neck line 504 and the meaningless-hand decision line 507 located to the right of the body line on the right 506 is ⑤, and a region below the meaningless-hand decision line 507 is ⑥.

Thereafter, the procedure goes to step S403.

[Step S403]

The body feature extraction part 302 extracts images corresponding to the body features stored in the segment element storage part 305 from the inputted images. The images extracted in this manner are hereinafter referred to as extracted body features.

FIG. 6 is a diagram showing exemplary segment element data stored in the segment element storage part 305.

In FIG. 6, the segment element data includes a body feature 601 and a motion feature 602. The body feature 601 includes one or more body features. In this example, the body feature 601 includes a face region, eyes, mouth, hand region and body, hand region and face region, and hand region.

The motion feature 602 is set to motion features respectively corresponding to the body features found in the body feature 601. Specifically, the tip of the chin when nodding is set as corresponding to the face region, blinking is set as corresponding to the eyes, change in the shape of mouth is set as corresponding to the mouth, a pause is taken as corresponding to the hand region and body, a motion of touching face with hand(s) is set as corresponding to the hand region and face region, and a point where the effectiveness of hands changes is set as corresponding to the hand region.

The body feature extraction part 302 detects the body features set in the body feature 601 as the extracted body features. When the body feature 601 is set to the "face region" for example, the body feature extraction part 302 extracts the face region as the extracted body features.

Herein, a description is now made how the face region is extracted.

The body feature extraction part 302 first extracts a beige region from the inputted images in accordance with the RGB color information. Then, the body feature extraction part 302 takes out, from the beige region, any part superimposing on a region whose region code is ② (head region) which was obtained by the division in step S402, and then regards the part as the face region.

Figures 7, 8:
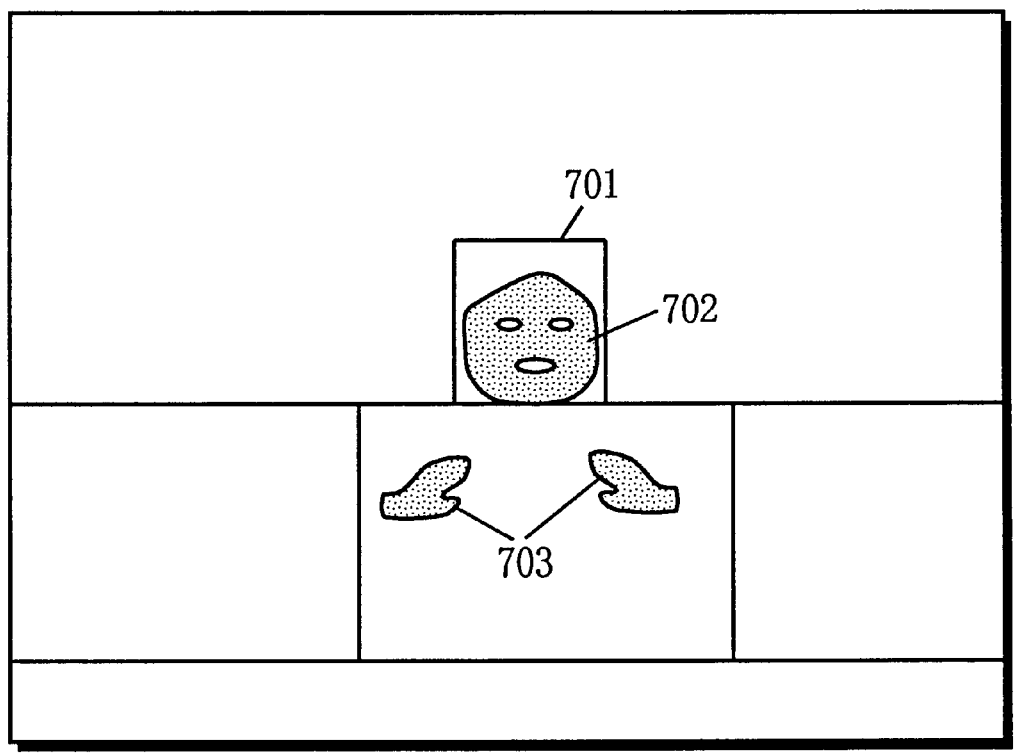
FIG. 7 is a diagram exemplarily showing a beige region extracted by the body feature extraction part 302.
FIG. 8 is a diagram exemplarily showing face region information generated by the body feature extraction part 302.

FIG. 7 is a diagram showing an exemplary beige region extracted by the body feature extraction part 302.

As shown in FIG. 7, the beige region includes a beige region for face 702 and a beige region for hands 703. Accordingly, the extraction made according to the RGB color information is not sufficient as both beige regions for face 702 and hands 703 are indistinguishably extracted. Therefore, as shown in FIG. 5, the inputted image is previously divided into regions ① to ⑥, and then only the part superimposing on the head region 701 (region ② in FIG. 5) is taken out from the extracted beige regions. In this manner, the beige region for face 702 is thus obtained.

Next, the body feature extraction part 302 generates face region information. It means, the body feature extraction part 302 sets i-th face region information face[i] with a barycenter, area, a lateral maximum length, and a vertical maximum length of the extracted face region.

FIG. 8 is a diagram showing exemplary face region information generated by the body feature extraction part 302.

In FIG. 8, the face region information includes barycentric coordinates 801 of the face region, an area 802 thereof, lateral maximum length 803 thereof, and vertical maximum length 804 thereof.

Thereafter, the procedure goes to step S404.

[Step S404]

When the frame number i is 1, the procedure returns to step S401. If not, the procedure goes to step S405.

[Step S405]

The feature movement tracking part 303 finds a feature movement code of the face region by referring to the i-th face region information face[i] and (i−1)th face region information face[i−1] with <Equation 1>. Further, the feature movement tracking part 303 finds a facial movement vector V-face[i] in the i-th face region by referring to a barycenter g_face[i] of the i-th face region information face[i] and a barycenter g_face[i−1] of the (i−1)th face region information face[i−1].

$$\left. \begin{array}{l} g\_face[i] = (Xgf[i], Ygf[i]) \\ g\_face[i-1] = (Xgf[i-1], Ygf[i-1]) \\ V\_face[i] = (Xgf[i], Xgf[i-1], Ygf[i] - Ygf[i-1]) \end{array} \right\} \quad \text{(Equation 1)}$$

Next, the feature movement tracking part 303 determines the feature movement code by referring to the facial movement vector V-face[i] in the i-th face region.

FIG. 9 is a diagram showing conditions of facial feature movements for the feature movement tracking part 303 to determine the feature movement code.

In FIG. 9, the conditions of facial feature movements include a movement code 901 and a condition 902. The movement code 901 is set to numbers "1" to "8" and the condition 902 is set to the conditions of facial feature movements corresponding to the respective numbers set to the movement code 901.

In detail, the feature movement tracking part 303 refers to the condition 902 in FIG. 9, and then selects any condition of facial feature movements corresponding to the facial movement vector V-face[i] in the i-th face region. Thereafter, the feature movement tracking part 303 picks up a number corresponding to the selected condition of facial feature movements from the movement code 901 in FIG. 9 to determine the feature movement code.

Then, the procedure goes to step S406.

[Step S406]

The segment position determination part 304 refers to the segment element data (refer to FIG. 6) stored in the segment element storage part 305, and checks whether or not the determined feature movement code coincides with the motion feature 602. The motion feature 602 is set to a parameter (motion feature parameter) indicating the motion feature for confirming segmentation.

FIG. 10 is a diagram showing an exemplary motion feature parameter set to the motion feature 602.

In FIG. 10, the motion feature parameter includes a motion feature 101, determination code 1002, time 1003, and position to segment 1004. The motion feature 1001 denotes a type of motion feature. The determination code 1002 is a code string used to determine the motion feature. The time 1003 is time used to determine the motion feature. The position to segment 1004 indicates positions to segment in the motion feature.

In the code string, included in the determination code 1002, each code is represented by numbers "1" to "8" in a similar manner as the movement code 901 (feature movement code) in FIG. 9, and a number "0" indicating a pause, and the codes are hyphenated.

When the codes are successive in such order of "1", "0" and "2", for example, it is determined that the feature movement codes determined in step S405 coincide with a code string of "1-0-2".

Herein, a code in brackets means that the code is relatively insignificant for determining in the aforementioned manner. For example, it is considered that a code string of "7-(0)-3" and that of "7-3" are the same.

Further, codes with a slash therebetween means that either code will do. In a case where codes are "0/3" for example, either code of "0" or "3" is considered sufficient (not shown).

A character of "*" means any code will do.

To detect nodding, the applicable body feature 601 in FIG. 6 is "face region", and the applicable motion feature 602 is "the tip of chin when nodding". In this case, the segment position determination part 304 determines whether or not the facial feature movement code determined in step S405 coincides with the code string of "7-(0)-3" corresponding to the "tip of chin when nodding" in FIG. 10.

The sign language gesture segmentation device judges whether or not j is 1. If j=1, the procedure goes to step S407. When j>1, the procedure advances to step S409.

[Step S407]

The sign language gesture segmentation device determines whether or not the feature movement code coincides with the first code of the determination code 1002. If yes, the procedure goes to step S408. If not, the procedure returns to step S401.

[Step S408]

The segment position determination part 304 generates determination code data. It means, the segment position determination part 304 sets a code number of first determination code data Code_data[1] to the feature movement code, and sets a code start frame number thereof to i.

FIG. 11 is a diagram showing exemplary determination code data generated by the segment position determination part 304.

In FIG. 11, the determination code data includes a code number 1101, code start frame number 1102, and code end frame number 1103.

When taking FIG. 10 as an example, with the feature movement code of "7" the code number of the first determination code data Code_data[1] is set to "7" and the code start frame number of the first determination code data Code_data[1] is set to i.

Thereafter, j is set to 2, and the procedure returns to step S401.

[Step S409]

It is determined whether or not the feature movement code coincides with a code number of (j−1)th determination code data Code_data[j−1]. If yes, the procedure returns to step S401.

If not, the procedure goes to step S410.

[Step S410]

The segment position determination part 304 sets a code end frame number of the (j−1)th determination code data Code_data[j−1] to (i−1). Thereafter, the procedure goes to step S411.

[Step S411]

It is determined whether or not the number of codes included in the determination code 1002 is j or more. If yes, the procedure goes to step S412.

When the number of codes included in the determination code 1002 is (j−1), the procedure advances to step S417.

[Step S412]

It is determined whether or not the j-th code of the determination code 1002 coincides with the feature movement code. If not, the procedure goes to step S413.

If yes, the procedure advances to step S416.

[Step S413]

It is determined whether or not the j-th code of the determination code 1002 is in brackets. If yes, the procedure goes to step S414.

If not, the procedure advances to step S415.

[Step S414]

It is determined whether or not the (j+1)th code of the determination code 1002 coincides with the feature movement code. If not, the procedure goes to step S415.

If yes, j is incremented by 1, then the procedure advances to step S416.

[Step S415]

First, j is set to 1, and then the procedure returns to step S401.

[Step S416]

The code number of the j-th determination code data Code_data[j] is set to the feature movement code. Further, the code start frame number of the j-th determination code data Code_data[j] is set to i. Then, j is incremented by 1. Thereafter, the procedure returns to step S401.

[Step S417]

The segment position determination part 304 finds the position to segment in the motion feature in accordance with the motion feature 1001 and the position to segment 1004 (refer to FIG. 10).

When the applicable motion feature is "the tip of chin when nodding", the segment position corresponding thereto is the lowest point among Y-coordinates. Therefore the segment position determination part 304 finds a frame number corresponding thereto.

Specifically, the segment position determination part 304 compares barycentric Y-coordinates in the face region for the respective frames applicable in the range between the code start number of the first determination code data Code_data[1] and the code end frame number of the (j−1)th determination code data Code_data[j−1]. Then, the frame number of the frame in which the barycentric Y-coordinate is the smallest (that is, barycenter of the face region comes to the lowest point) is set as the segment position in the motion feature.

Note that, when several frame numbers are applicable to the lowest point of the Y-coordinate, the first (the smallest) frame number is considered as being the segment position.

Thereafter, the procedure goes to step S418.

[Step S418]

The sign language gesture segmentation device outputs the position to segment. Thereafter, the procedure returns to step S401 to repeat the same processing as described above.

In such manner, the method of segmenting sign language gestures can be realized with the detection of nodding.

Hereinafter, the method of segmenting sign language gesture with the detection of blinking is described.

In the method of segmenting sign language gesture with the detection of blinking, the processing in step S403 described for the detection of nodding (refer to FIG. 4) is altered as follows.

[Step S403a]

The body feature extraction part 302 extracts images corresponding to the body feature 601 (refer to FIG. 6) stored in the segment element storage part 305 from the inputted images.

When detecting blinking, the body feature 601 is set to "eyes" and the body feature extraction part 302 extracts eyes as the extracted body features.

Herein, a description is made how the eyes are extracted.

First of all, the face region is extracted in a similar manner to step S403. Then, the eyes are extracted from the extracted face region in the following manner.

Figures 12, 13:
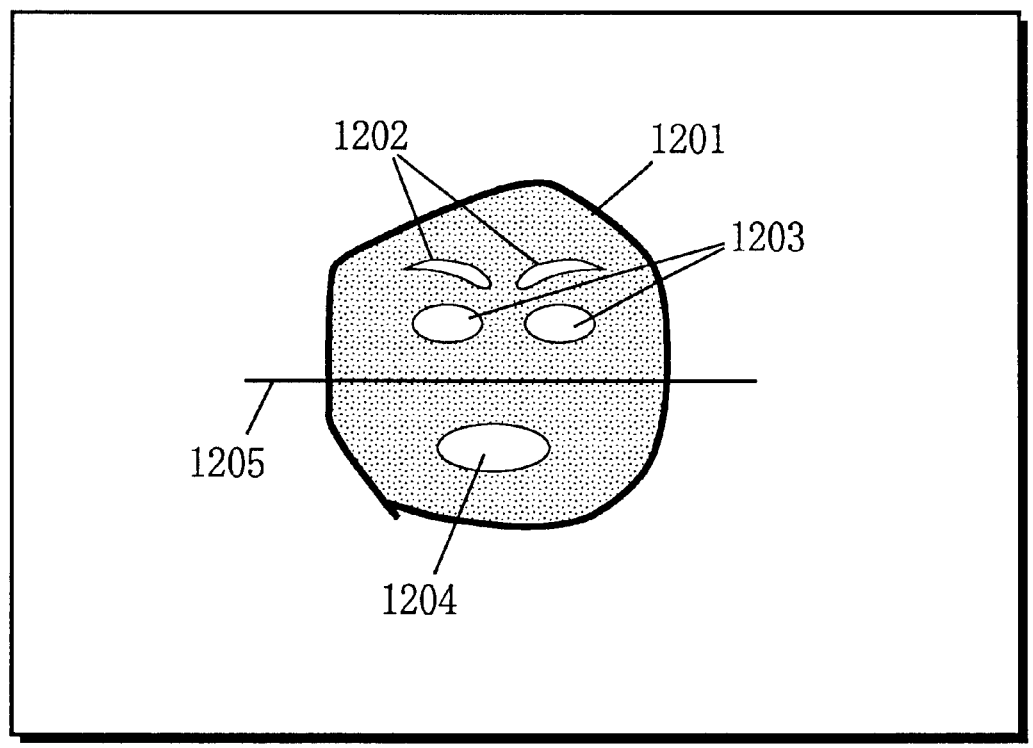
FIG. 12 is a diagram exemplarily showing a beige region in a face extracted by the body feature extraction part 302.
FIG. 13 is a diagram exemplarily showing eye region information generated by the body feature extraction part 302.

FIG. 12 is a diagram showing an exemplary face region extracted by the body feature extraction part 302.

In FIG. 12, the extracted face region 1201 includes two hole regions made by eyebrows 1202, two hole regions made by eyes 1203, and a hole region made by a mouth 1204 (a shaded area is the beige region).

A straight line denoted by a reference numeral 1205 in the drawing is a face top-and-bottom partition line. The face top-and-bottom partition line 1205 is a line which partitions the extracted face region 1201 into two, top and bottom.

First, this face top-and-bottom partition line 1205 is drawn between an upper and lower ends of the face in a position designated by a face top-and-bottom partition ratio. Herein, the face top-and-bottom partition ratio is a parameter, and is set in such manner that the hole regions made by eyes 1203 are in the region above the face top-and-bottom partition line 1205. The face top-and-bottom partition ratio is set to be "½" in this embodiment.

Next, any hole region in the face region located above the face top-and-bottom partition line 1205 is detected.

When two hole regions are detected, the hole regions are judged as being eyebrows and eyes as being closed.

When three hole regions are detected, it is judged that one eye is closed, and any one hole region located in the lower part is judged as being an eye.

When four hole regions are detected, it is judged that both eyes are open, and any two hole regions located in the lower part are judged as being eyes.

When taking FIG. 12 as an example, there are four hole regions. Therefore, the two hole regions located in the lower part are the hole region made by eyes 1203.

Then, the body feature extraction part 302 generates eye region information. Specifically, the number of the extracted eyes and the area thereof are both set in an i-th eye region information eye[i].

FIG. 13 is a diagram showing exemplary eye region information generated by the body feature extraction part 302.

In FIG. 13, the eye region information includes the number of eyes 1301, an area of the first eye 1302, and an area of the second eye 1303.

The body feature extraction part 302 first sets the number of eyes 1301 to the number of the extracted eyes, then sets the area of eye(s) according to the number of the extracted eyes in the following manner.

When the number of the extracted eyes is 0, the area of the first eye 1302 and the area of the second eye 1303 are both set to 0.

When the number of the extracted eyes is 1, the area of the eye (hole region made by eyes 1203) is calculated and set in the area of the first eye 1302. The area of the second eye is set to 0.

When the extracted number of eyes is 2, the area of the respective eyes is calculated. The area of the first eye 1302 is set to the area of the left eye (hole region made by eyes 1203 on the left), and the area of the second eye 1303 is set to the area of the right eye.

Thereafter, the procedure goes to step S404.

In the method of segmenting the sign language gesture with the detection of blinking, the processing in step S404 is altered as follows.

[Step S405a]

The feature movement tracking part 303 finds, with <Equation 2>, a feature movement code for eyes by referring to the i-th eye region information eye[i] and (i−1)th eye region information eye[i−1]. Further, the feature movement tracking part 303 finds a change d1_eye[i] in the area of the first eye in the i-th eye region by referring to an area s1_eye[i] of the first eye of the i-th eye region information eye[i] and an area s1_eye[i−1] of the first eye of the (i−1)th eye region information eye[i]. Still further, the feature movement tracking part 303 finds a change d2_eye[i] in the area of the second eye in the i-th eye region by referring to an area s2_eye[i] of the second eye of the i-th eye region information eye[i] and an area s2_eye[i−1] of the second eye of the (i−1)th eye region information eye[i−1].

$$\left. \begin{array}{l} d1\_eye[i] = s1\_eye[i] - s1\_eye[i-1] \\ d2\_eye[i] = s2\_eye[i] - s2\_eye[i-1] \end{array} \right\} \quad \langle \text{Equation 2} \rangle$$

FIG. 14 is a diagram showing conditions of feature movements for eyes for the feature movement tracking part 303 to determine the feature movement code.

In FIG. 14, the conditions of feature movements for eyes include a movement code 1401 and a condition 1402. The movement code 1401 is set to numbers of "0" to "6" and the condition 1402 is set to the conditions of feature movements for eyes corresponding to the respective numbers set to the movement code 1401.

A character α found in the condition 1402 is a threshold value of the area of eye(s) used to determine whether or not the eye(s) is closed, and is set to "1", for example. A character β is a threshold value of a change in the size of eye(s) used to determine whether or not the size of the eye(s) is changed, and is set to "5" for example.

In other words, the feature movement tracking part 303 refers to the condition 1402 in FIG. 14, and selects any condition of feature movements for eyes corresponding to the i-th eye region information eye[i], the change d1_eye[i] in the area of the first eye in the i-th eye region, and the change d2_eye[i] in the area of the second eye therein. Thereafter, the feature movement tracking part 303 picks up a number corresponding to the selected condition of feature movements for eyes from the movement code 1401 in FIG. 14, and then determines the feature movement code.

When both eyes are closed, for example, the condition will be s1_eye[i]≦α, s2_eye[i]≦α, and the feature movement code at this time is 0.

Thereafter, the procedure goes to step S406.

In the method of segmenting sign language gesture with the detection of blinking, processing in step S417 is altered as follows.

[Step S417a]

The segment position determination part 304 finds the position to segment in the motion feature in accordance with the motion feature 1001 and the position to segment 1004 (refer to FIG. 10).

When the applicable motion feature is "blinking" the position to segment corresponding to "blinking" is a point where the eye region becomes invisible. Therefore, the segment position determination part 304 determines a frame number corresponding thereto.

That is, the code start frame number of the second determination code data Code_data[2] is determined as the position to segment.

Then, the procedure goes to step S418.

In such manner, the method of segmenting sign language gestures can be realized with the detection of blinking.

Next, the method of segmenting sign language gestures with the detection of change in the shape of mouth (closing a mouth) is described.

In this case, step S403 described for the method of segmenting sign language gestures with the detection of blinking is altered as follows.

[Step S403b]

The body feature extraction part 302 extracts images corresponding to the body feature 601 (refer to FIG. 6) stored in the segment element storage part 305 from the inputted images.

When detecting any change in the shape of mouth (closing a mouth), the body feature is set to "mouth" and then the body feature extraction part 302 extracts the mouth as the extracted body features.

Herein, a description is made how the mouth is extracted.

First of all, the face region is extracted in a similar manner to step S403. Second, a mouth is extracted from the extracted face region in the following manner.

In FIG. 12, the face top-and-bottom partition line 1205 is drawn as is in step S403. Then, any hole region in the face region located below the face top-and-bottom partition line 1205 is detected.

When two or more hole regions are detected, any one hole region whose distance from the lower end of a face being closest to the condition of a distance between a position of an average person's mouth and the lower end of a face is regarded as the mouth, which is a parameter. In this embodiment, the condition is set to "10".

When one hole region is detected, the hole region is regarded as the mouth.

When no hole region is detected, the mouth is judged as being closed.

When taking FIG. 12 as an example, there is only one hole region below the face top-and-bottom partition line 1205. Therefore, the hole region is the hole region made by the mouth 1204.

Next, the body feature extraction part 302 generates mouth region information. To be more specific, an area of the extracted mouth and a vertical maximum length thereof are set in i-th mouth region information mouth[i].

FIG. 15 is a diagram showing exemplary mouth region information generated by the body feature extraction part 302.

In FIG. 15, the mouth region information includes an area of mouth 1501, and a vertical maximum length thereof 1502.

The body feature extraction part 302 calculates the area of the extracted mouth, and sets the calculation in the area of mouth 1501. Furthermore, the body feature extraction part 302 calculates the vertical maximum length of the mouth, and then sets the calculated length in the vertical maximum length of mouth 1502.

Thereafter, the procedure goes to step S404.

In the method of segmenting sign language gesture with the detection of change in the shape of mouth, the processing in step S405 is altered as follows.

[Step S405b]

The feature movement tracking part 303 finds a feature movement code for mouth by referring to the i-th mouth region information mouth[i] and (i−1)th mouth region information mouth[i−1]. Further, the feature movement tracking part 303 finds a change d_mouth[i] in the area of the mouth in the i-th mouth region by referring to an area s_mouth[i] of the i-th mouth region information mouth[i] and an area s_mouth[i−1] of the (i−1)th mouth region information mouth[i−1] with <Equation 3>.

$$d\_mouth[i]=s\_mouth[i]-s\_mouth[i-1] \qquad \text{<Equation 3>}$$

Still further, the feature movement tracking part 303 finds, with <Equation 4>, a vertical change y_mouth[i] in the length of the mouth in the i-th mouth region by referring to the vertical maximum length h_mouth[i] of the i-th mouth region information mouth[i] and a vertical maximum length h mouth[i−1] of the (i−1)th mouth region information mouth [i−1].

$$y\_mouth[i]=h\_mouth[i]-h\_mouth[i-] \qquad \text{<Equation 4>}$$

FIG. 16 is a diagram showing conditions of feature movements for the mouth for the feature movement tracking part 303 to determine the feature movement code.

In FIG. 16, the conditions of feature movements for the mouth include a movement code 1601 and a condition 1602. The movement code 1601 is set to numbers "0" and "1" and the condition 1602 is set to the conditions of feature movements for the mouth corresponding to the respective numbers set to the movement code 1601.

A character γ found in the condition 1602 is a threshold value of the change in the area of mouth used to determine whether or not the shape of the mouth is changed, and is set to "5" in this embodiment, for example. A character λ is a threshold value of the vertical change in the length of mouth, and is set to "3", for example.

Specifically, the feature movement tracking part 303 refers to the condition 1602 in FIG. 16, and then selects any condition of feature movements for mouth corresponding to the change d_mouth[i] in the area of the mouth in the i-th mouth region and the vertical maximum length h_mouth[i] in the length of the mouth in the i-th mouth region. Thereafter, the feature movement tracking part 303 picks up a number corresponding to the selected condition of feature movements for the mouth from the movement code 1601 in FIG. 16, and then determines the feature movement code.

When the mouth is closed, for example, the condition is s_mouth[i]≦γ, and the feature movement code at this time is "0".

Thereafter, the procedure goes to step S406.

In the method of segmenting sign language gesture with the detection of change in the shape of the mouth, the processing in step S417 is altered as follows.

[Step S417b]

The segment position determination part 304 determines the position to segment in the movement feature in accordance with the movement feature 1001 and the position to segment 1004 (refer to FIG. 10).

When the applicable movement feature is "changing the shape of mouth", the segment position corresponding thereto is starting and ending points of change. Therefore, the segment position determination point 304 finds frame numbers respectively corresponding thereto.

In detail, the segment position determination part 304 outputs both the code start frame number of the second determination code data Code_data[2] and the code end frame number thereof as the position to segment.

Thereafter, the procedure goes to step S418.

In such manner, the method of segmenting sign language gestures can be realized with the detection of change in the shape of the mouth.

Hereinafter, the method of segmenting sign language gestures with the detection of stopping of hands or body is described.

In this case, the processing in step S403 described for the method of segmenting sign language gestures with the detection of blinking is altered as follows.

[Step S403c]

The body feature extraction part 302 extracts images corresponding to the body feature 601 (refer to FIG. 6) stored in the segment element storage part 305 from the inputted images.

When detecting any stopping of hands or body, the body feature 601 is set to "hand region, body" and the body feature extraction part 302 extracts the hand region and body as the extracted body features.

Herein, a description is made how the hand region and body are extracted.

First of all, the body feature extraction part 302 extracts the hand region in a similar manner to step S403 in the foregoing. That is, the body feature extraction part 302 extracts the beige region from the inputted images, then takes out any part not superimposing on the head region from the extracted beige region, and regards the part as the hand region.

When taking FIG. 7 as an example, a region not superimposing on the head region, that is, the hand region 703 is extracted from the beige region.

As to the body, the human-body region extracted in step S402 is considered being the body.

Second, the body feature extraction part 302 generates hand region information. To be more specific, the i-th hand region information hand[i] is set to a barycenter, area, lateral maximum length, and vertical maximum length of the extracted hand region. Then, i-th body information body[i] is set to a barycenter, area, lateral maximum length, and vertical maximum length of the extracted body.

FIG. 17 is a diagram showing exemplary hand region information generated by the body feature extraction part 302.

In FIG. 17, the hand region information includes the number of hands 1701, barycentric coordinates of the first hand 1702, an area of the first hand 1703, barycentric coordinates of the second hand 1704, and an area of the second hand 1705.

The body feature extraction part 302 first sets the number of the extracted hands in the number of hands 1701, and then sets the barycentric coordinates of hand(s) and the area of hand(s) according to the number of the extracted hands in the following manner.

When the number of extracted hands 1701 is 0, the barycentric coordinates of the first hand 1702 and the barycentric coordinates of the second hand 1704 are both set to (0, 0), and the area of the first hand 1703 and the area of the second hand 1704 are both set to 0.

When the number of extracted hands 1701 is "1", the barycentric coordinates and the area of the hand region are calculated so as to set the calculations respectively in the barycentric coordinates of the first hand 1702 and the area of the first hand 1703. Thereafter, the barycentric coordinates of the second hand 1704 is set to (0, 0), and the area of the second hand 1704 is set to 0.

When the number of extracted hands 1701 is "2", the barycentric coordinates and the area of the hand region on the left are calculated so as to set the calculations respectively to the barycentric coordinates of the first hand 1702 and the area of the first hand 1703. Furthermore, the barycentric coordinates and the area of the hand region on the right are calculated so as to set the calculations respectively to the barycentric coordinates of the second hand 1704 and the area of the second hand 1705.

The body information body[i] can be realized with the structure in FIG. 8 as is the face region information face[i].

Then, the procedure goes to step S404.

In the method of segmenting sign language gesture with the detection of stopping of hands or body, the processing in step S405 is altered as follows.

[Step S405c]

The feature movement tracking part 303, with <Equation 5>, finds a feature movement code for hand region and body by referring to the i-th hand region information hand[i], the (i−1)th hand region information hand[i−1], the i-th body information body[i], and (i−1)th body information body[i−1]. Further, the feature movement tracking part 303 finds a moving quantity m1_hand[i] of the first hand in the i-th hand region by referring to the barycenter g1_hand[i] of the first hand of the i-th hand region information hand[i] and the barycenter g1_hand[i−1] of the first hand of the (i−1)th hand region information hand[i−1]. Still further, the feature movement tracking part 303 finds a moving quantity m2_hand[i] of the second hand in the i-th hand region by referring to the barycenter g2_hand[i] of the second hand of the i-th hand region information hand[i] and the barycenter g2_hand[i−1] of the second hand of the (i−1)th hand region information hand[i−1].

$$\left.\begin{aligned}&g1\_hand[i] = (Xgh1[i], Ygh1[i]) \\ &g1\_hand[i-1] = (Xgh[i-1], Ygh1[i-1]) \\ &m1\_hand[i] = \sqrt{(Xgh1[i], Xgh1[i-1])^2 + (Ygh1[i] - Ygh1[i-1])^2} \\ &g2\_hand[i] = (Xgh2[i], Ygh2[i]) \\ &g2\_hand[i-1] = (Xgh2[i-1], Ygh2[i-1]) \\ &m2\_hand[i] = \sqrt{(Xgh2[i], Xgh2[i-1])^2 + (Ygh2[i] - Ygh2[i-1])^2}\end{aligned}\right\} \quad \langle\text{Equation 5}\rangle$$

Further, the feature movement tracking part 303 finds, with <Equation 6>, the change d1_hand[i] in the area of the first hand in the i-th hand region by referring to the area s1_hand[i] of the first hand of the i-th hand region information hand[i] and the area s1_hand[i−1] of the first hand in the (i−1)th hand region information hand[i−1]. Still further, the feature movement tracking part 303 finds the change d2_hand[i] in the area of the second hand in the 1-th hand region by referring to the area s2_hand[i] of the second hand of the i-th hand region information hand[i] and the area s2_hand[i−1] of the second hand of the (i−1)th hand region information hand[i−1].

$$\left.\begin{aligned}&d1\_hand[i] = s1\_hand[i] - s1\_hand[i-1] \\ &d2\_hand[i] = s2\_hand[i] - s2\_hand[i-1]\end{aligned}\right\} \quad \langle\text{Equation 6}\rangle$$

Further, the feature movement tracking part 303 finds, with <Equation 7>, a moving quantity m_body[i] of the i-th body by referring to a barycenter g_body[i] of the i-th body information body[i] and a barycenter g_body[i−1] of the (i−1)th body information body[i−1].

$$\left.\begin{aligned}&g\_body[i] = (Xgb[i], Ygb[i]) \\ &g\_body[i-1] = (Xgb[i-1], Ygb[i-1]) \\ &m\_body[i] = \sqrt{(Xgb[i], Xgb[i-1])^2 + (Ygb[i] - Ygb[i-1])^2}\end{aligned}\right\} \quad \langle\text{Equation 7}\rangle$$

FIG. 18 is a diagram showing conditions of feature movements for body and hand region.

In FIG. 18, the conditions of feature movements for body and hand region include a movement code 1801 and a condition 1802. The movement code 1801 is set to numbers "0" and "1", and the condition 1802 is set to the conditions of feature movements for body and hand region corresponding to the respective numbers set to the movement code 1801.

A character χ found in the condition 1802 is a threshold value used to determine whether or not the hand region is stopped, and is set to "5" in this embodiment, for example. A character δ is a threshold value used to determine whether or not the shape of the hand region is changed, and is set to "10", for example. A character ε is a threshold value used to determine whether or not the body is stopped, and is set to "5", for example.

Specifically, the feature movement tracking part 303 refers to the condition 1802 in FIG. 18, and then selects any condition of feature movements for the hand region and body corresponding to the moving quantity m1_hand[i] of the first hand in the i-th hand region, the moving quantity m2_hand[i] of the second hand in the i-th hand region, the chance d1_hand[i] in the area of the first hand in the i-th hand region, the change d2_hand[i] in the area of the second hand in the i-th hand region, and the moving quantity m_body[i] of the i-th body. Thereafter, the feature movement tracking part 303 picks up a number corresponding to the selected condition of feature movements for hand region and body from the movement code 1801 in FIG. 18, and then determines the feature movement code.

When the hand is moving from left to right, and vice versa, the condition of the moving quantity in the i-th hand region is m_hand[i]>χ, and the feature movement code at this time is "1".

Thereafter, the procedure goes to step S406.

In the method of segmenting sign language gestures with the detection of stopping of hands or body, the processing in step S417 is altered as follows.

[Step S417c]

The segment position determination part 304 determines the position to segment in the motion feature in accordance with the motion feature 1001 and the position to segment 1004 (refer to FIG. 10).

When the applicable motion feature is "stopping", the position to segment corresponding thereto is starting and ending points of gesture, and thus the segment position determination part 304 finds frame numbers respectively corresponding thereto.

Alternatively, the segment position determination part 304 may find a frame number corresponding to an intermediate point therebetween. In this case, the code start frame number of the first determination code data Code_data[1] and the code end frame number thereof are first determined, and then an intermediate value thereof is calculated.

Thereafter, the procedure goes to step S418.

In such manner, the method of segmenting sign language gestures can be realized with the detection of stopping of hands or body.

Next, the method of segmenting sign language gestures with the detection of the gesture of touching face with hand(s) is described.

In this case, step S403 described for the method of segmenting sign language gestures with the detection of nodding (refer to FIG. 4) is altered as follows.

[Step S403d]

The body feature extraction part 302 extracts images corresponding to the body feature 601 (refer to FIG. 6) stored in the segment element storage part 305 from the inputted images.

To detect the gesture of touching face with hand(s), the body feature is set with "face region, hand region" and the face region and hand region are extracted as the extracted body features.

Herein, a description is made how the face region and hand region are extracted.

First of all, the face region is extracted in a similar manner to step S403, and the hand region is extracted in a similar manner to step S403c.

Next, the i-th face region information face[i] is set to a barycenter, area, lateral maximum length, and vertical maximum length of the extracted face region. Further, the i-th hand region information hand[i] is set to a barycenter, area, lateral maximum length, and vertical maximum length of the extracted hand region.

Thereafter, the procedure goes to step S404.

In the method of segmenting sign language gestures with the detection of the gesture of touching face with hand(s), the processing in step S405 is altered as follows.

[Step S405d]

The feature movement tracking part 303, with <Equation 8>, finds a feature movement code for the hand region and face region by referring to the i-th hand region information hand[i] and the i-th face region information face[i]. Further, the feature movement tracking part 303 finds a distance I1_fh[i] between the first hand and face in the i-th hand region by referring to the barycenter g1_hand[i] of the first hand of the i-th hand region information hand[i] and the barycenter g_face[i] of the i-th face region information face[i]. Still further, the feature movement tracking part 303 finds a distance I2_fh[i] between the second hand and face in the i-th hand region by referring to the barycenter g2_hand[i] of the second hand of the i-th hand region information hand[i] and the barycenter g_face[i-1] of the i-th face region information face[i].

$$\left. \begin{array}{l} g1\_hand[i] = (Xgh1[i], Ygh1[i]) \\ g2\_hand[i] = (Xgh2[i], Ygh2[i]) \\ g\_face[i] = (Xgf[i], Ygf[i]) \\ I1\_fh[i] = \sqrt{(Xgh1[i] - Xgf[i])^2 + (Ygh1[i] - Ygf[i])^2} \\ I2\_fh[i] = \sqrt{(Xgh2[i] - Xgf[i])^2 + (Ygh2[i] - Ygf[i])^2} \end{array} \right\} \quad \text{(Equation 8)}$$

Note that, when the area s1_hand[i] of the first hand of the i-th hand region information hand[i] is 0, I1_fh[i]=0 if I1_fh[i−1]≦Φ. I1_fh[i]=1000 if I1_fh[i−1]>Φ.

Similarly, when the area s2_hand[i] of the second hand of the i-th hand region information hand[i] is 0, I2_fh[i]=0 if I2_fh[i−1]≦Φ. I1_fh[i]=1000 if I2_fh[i]>Φ. Herein, Φ stands for a threshold value of distance between hand(s) and face, and is set to "20" in this embodiment, for example.

FIG. 19 is a diagram showing conditions of feature movements for the gesture of touching face with hand(s) for the feature movement tracking part 303 to determine the feature movement code.

In FIG. 19, the conditions of feature movements for the gesture of touching face with hand(s) include a movement code 1901 and a condition 1902. The movement code 1901 is set with numbers "0" and "1" and the condition 1902 is set with the conditions of feature movements for the gesture of touching face with hand(s) corresponding to the respective numbers set to the movement code 1901.

A character ω found in the condition 1902 is a threshold value of touching face region with hand region, and is set to "5" in this embodiment, for example.

To be more specific, the feature movement tracking part 303 refers to the condition 1902 in FIG. 19, and then selects any condition of feature movements corresponding to the distance I1_fh[i] between the first hand and face in the i-th hand region and the distance I2_fh[i] between the second hand and face in the i-th face region I2_fh[i]. Then, the feature movement tracking part 303 picks up a number corresponding to the selected condition of feature movements from the movement code 1901 in FIG. 19, and then determines the feature movement code.

When the right hand is superimposing on the face, for example, the distance I1_fh[i] between the first hand and face in the i-th hand region will be 0, and the feature movement code at this time is "0".

Thereafter, the procedure goes to step S406.

In the method of segmenting sign language gestures with the detection of the gesture of touching face with hand(s), the processing in step S417 is altered as follows.

[Step S417d]

The segment position determination part 304 determines the position to segment in the motion feature in accordance with the motion feature 1001 and the position to segment 1004 (refer to FIG. 10).

When the applicable motion feature is "gesture of touching face with hand(s)", the position to segment corresponding thereto is "starting and ending points of touching". Therefore, the segment position determination part 304 finds frame numbers respectively corresponding to both the starting point and ending points for the gesture of touching face with hand(s).

Specifically, both the code frame start number of the first determination code data Code_data[1] and the code end frame number thereof are regarded as the position to segment.

Thereafter, the procedure returns to step S401.

In such manner, the method of segmenting sign language gestures can be realized with the detection of the gesture of touching face with hand(s).

Next, a description is made how the change in effectiveness of hands is detected.

In this case, the processing in step S403 described for the method of segmenting sign language gesture with the detection of nodding is altered as follows.

[Step S403e]

The body feature extraction part 302 extracts images corresponding to the body feature 601 (refer to FIG. 6) stored in the segment element storage part 305 from the inputted images.

To detect the change in effectiveness of hands, the body feature 601 is set to "hand region" and the body feature extraction part 302 extracts the hand region as the extracted body features.

Note that the hand region is extracted in a similar manner to step S403c.

Then, the body feature extraction part 302 sets the i-th hand region information hand[i] with the barycenter, area, lateral maximum length and vertical maximum length of the extracted hand region.

Thereafter, the procedure advances to step S404.

In the method of segmenting sign language gestures with the detection of the change in effectiveness of hands, the processing in step S405 is altered as follows.

[Step S405e]

The feature movement tracking part 303 finds, with the aforementioned <Equation 5>, a feature movement code for the effectiveness and motions of hands by referring to the i-th hand region information hand[i].

Further, the feature movement tracking part 303 determines to which region among the several regions obtained by the spatial-segmentation in step S402 (refer to FIG. 5) the first hand belongs by referring to the barycenter g1_hand[i] of the first hand of the i-th hand region information hand[i], finds the region code thereof, and then sets the same in a hand region spatial code sp1_hand[i] of the first hand. Note that, when the area s1_hand[i] of the first hand of the i-th hand region information hand[i] is 0, the hand region spatial code sp1_hand[i] of the first hand is set to "6".

Still further, the feature movement tracking part 303 finds the region code by referring to the barycenter g2_hand[i] of the second hand of the i-th hand region information hand[i] so as to set the same in a hand region spatial code sp2_hand[i] of the second hand. When the area s2_hand[i] of the second hand of the i-th hand region information is 0, the hand region spatial code sp2_hand[i] of the second hand is set to "6".

Still further, the feature movement tracking part 303 finds the moving quantity m1_hand[i] of the first hand of the i-th hand region by referring to the barycenter g1_hand[i] of the first hand of the i-th hand region information hand[i] and the barycenter g1_hand[i−1] of the first hand of the (i−1)th hand region information hand[i−1].

Still further, the feature movement tracking part 303 finds the moving quantity m2_hand[i] of the second hand in the i-th hand region by referring to the barycenter g2_hand[i] of the second hand of the i-th hand region information hand[i] and the barycenter g2_hand[i−1] of the second hand of the (i−1)th hand region information hand[i].

FIG. 20 is a diagram showing conditions of feature movements for the change in effectiveness of hands for the feature movement tracking part 303 to determine the feature movement code.

In FIG. 20, the conditions of feature movements for the change in effectiveness of hands include a movement code 2001 and a condition 2002. The movement code 2001 is set to numbers of "0" to "5" and the condition 2002 is set to conditions of feature movements for the gesture of touching face with hands corresponding to the respective numbers set to the movement code 2001.

A character $\chi$ found in the condition 2002 is a threshold value used to determine whether or not the hand region is stopped, and is set to "5" in this embodiment, for example.

In detail, the feature movement tracking part 303 refers to the condition 2002 in FIG. 20, and then selects any condition of feature movements for the gesture of touching face with hand(s) corresponding to the hand region spatial code sp1_hand[i] of the first hand in the i-th hand region, the moving quantity m1_hand[i] of the first hand in the i-th hand region, the hand region spatial code sp2_hand[i] of the second hand in the i-th hand region, and the moving quantity m2_hand[i] of the second hand in the i-th hand region.

When the right hand is moving and the left hand is lowered to the lowest position of the inputted image 501 (refer to FIG. 5), the condition of the moving quantity m1_hand[i] of the first hand in the i-th hand region is m1_hand[i]>$\chi$, the hand region spatial code sp2_hand[i] of the second hand in the i-th hand region is 7, and the feature movement code at this time is "2".

Thereafter, the procedure goes to step S406.

In the method of segmenting sign language gesture with the detection of the change in effectiveness of hands, the processing in step S417 is altered as follows.

[Step S417e]

The segment position determination part 304 finds the position to segment in the motion feature in accordance with the motion feature 1001 and the position to segment 1004 (refer to FIG. 10).

When the applicable motion feature is the "point where the effectiveness of hands is changed", the position to segment corresponding thereto is a "changing point of code", and the segment position determination part 304 thus finds a frame number corresponding thereto.

To be more specific, the code start frame number of the first determination code data Code_data[1] and the code end frame number thereof are regarded as the position to segment.

Thereafter, the procedure goes to step S418.

In such manner, the method of segmenting sign language gestures can be realized with the detection of the change in the effectiveness of hands.

Hereinafter, the method of segmenting sign language gestures with the combined detection of the aforementioned gestures is described.

In this method, the processing in step S403 described for the method of segmenting sign language gesture with the detection of nodding (refer to FIG. 4) is altered as follows.

[Step S403f]

The body feature extraction part 302 extracts images corresponding to the body feature 601 (refer to FIG. 6) stored in the segment element storage part 305 from the inputted images.

To detect the respective gestures in the foregoing, the body feature 601 is set to "face region", "eyes", "mouth", "hand region, body", "hand region, face region" and "hand region", and the body feature extraction part 302 extracts the face region, eyes, mouth, and hand region and body as the extracted body features.

Note that, the face region is extracted in a similar manner to step S403. The eyes are extracted in a similar manner to step S403a. The mouth is extracted in a similar manner to step S403b. The hand region and body are extracted in a similar manner to step S403c.

Next, the body feature extraction part 302 sets information relevant to the extracted face region, eyes, mouth, hand region and body respectively to the face region information face[i], the eye region information eye[i], the mouth region information mouth[i], the hand region information hand[i], and the body information body[i].

Thereafter, the procedure goes to step S404.

Then, the sign language gesture segmentation device executes processing in steps S405 to S417, and thereafter in steps S405b to S417b. Thereafter, the sign language gesture segmentation device successively executes processing in steps S405c to S417c, steps S405d to S417d, and S405e to S417d.

In such manner, the method of segmenting sign language gestures with the combined detection of the aforementioned gestures can be realized.

Next, the method of segmenting sign language gestures in which each duration of detected gestures is considered before segmenting is described.

Figure 21:
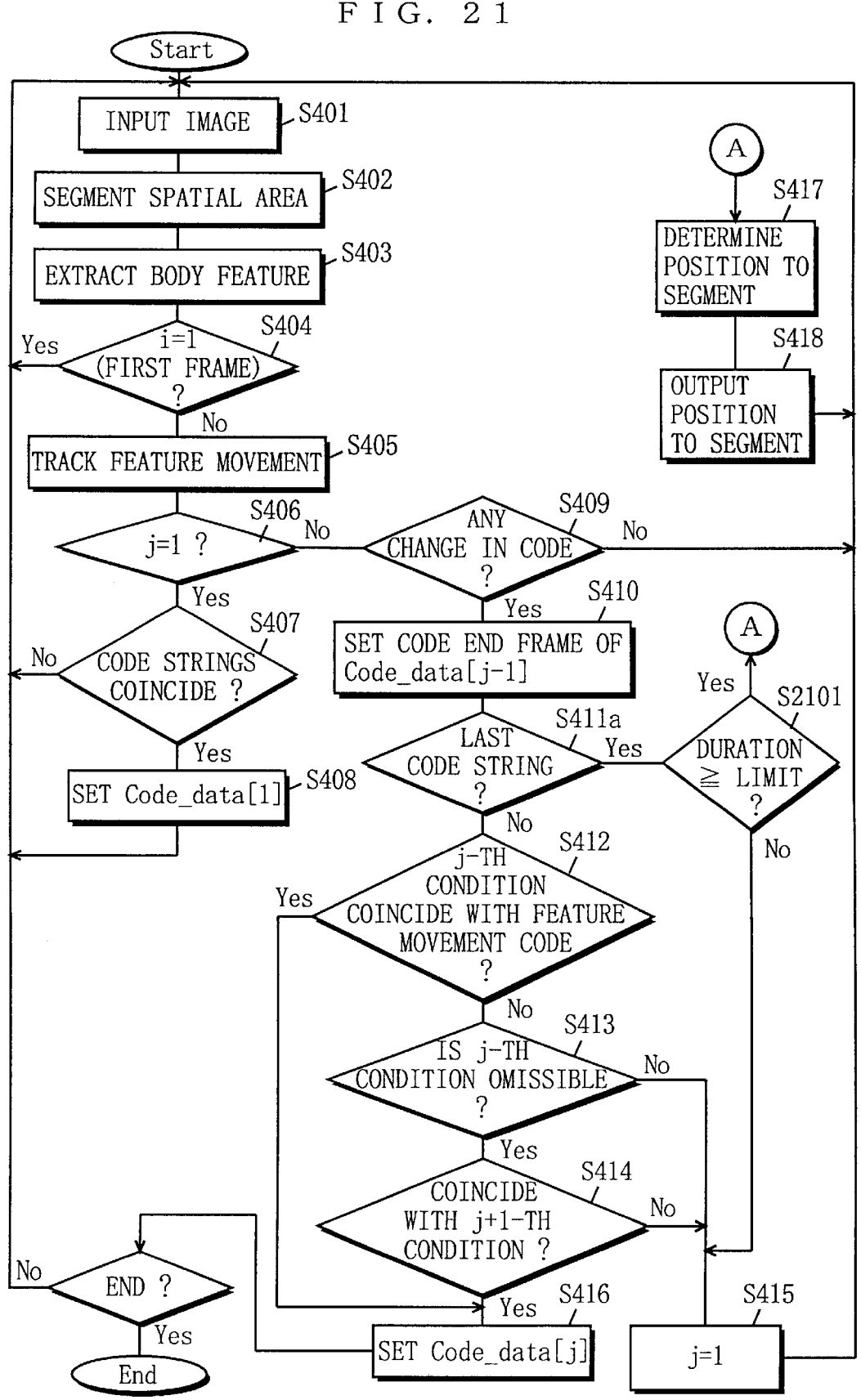
FIG. 21 is a flowchart illustrating, in the method of segmenting sign language gesture with the detection of nodding (refer to FIG. 4), how the segmentation is done while considering each duration of the detected gestures.

FIG. 21 is a flowchart illustrating, in the method of segmenting sign language gestures with the detection of nodding (refer to FIG. 4), how the segmentation is done while considering each duration of the detected gestures.

The method shown in FIG. 21 is similar to the method in FIG. 4 except step S4111 is being altered in the following manner and step S2101 is being additionally provided.

[Step S411a]

First, it is determined whether or not the number of codes included in the determination code 1002 is j or more. If yes, the procedure goes to step S412.

When the number is (j−1), the procedure advances to step S2101.

[Step S2101]

First of all, the number of frames applicable in the range between the code start number of the first determination code data Code_data[1] and the code end frame number of the (j−1)th determination code data Code_data[j−1] is set in a feature duration.

Then, it is determined whether or not any value is set in the time 1003 included in the motion feature parameter (refer to FIG. 10), and thereafter, it is determined whether or not the feature duration is smaller than the value set to the time 1003.

If the time 1003 is set to any value, and if the feature duration is smaller than the value set to the time 1003, the procedure goes to step S417.

In such manner, the method of segmenting sign language gestures in which each duration of the detected gestures is considered can be realized.

Hereinafter, the method of segmenting sign language gestures in which a non-segment element is detected as well as a segment element is described.

Third Embodiment

Figure 22:
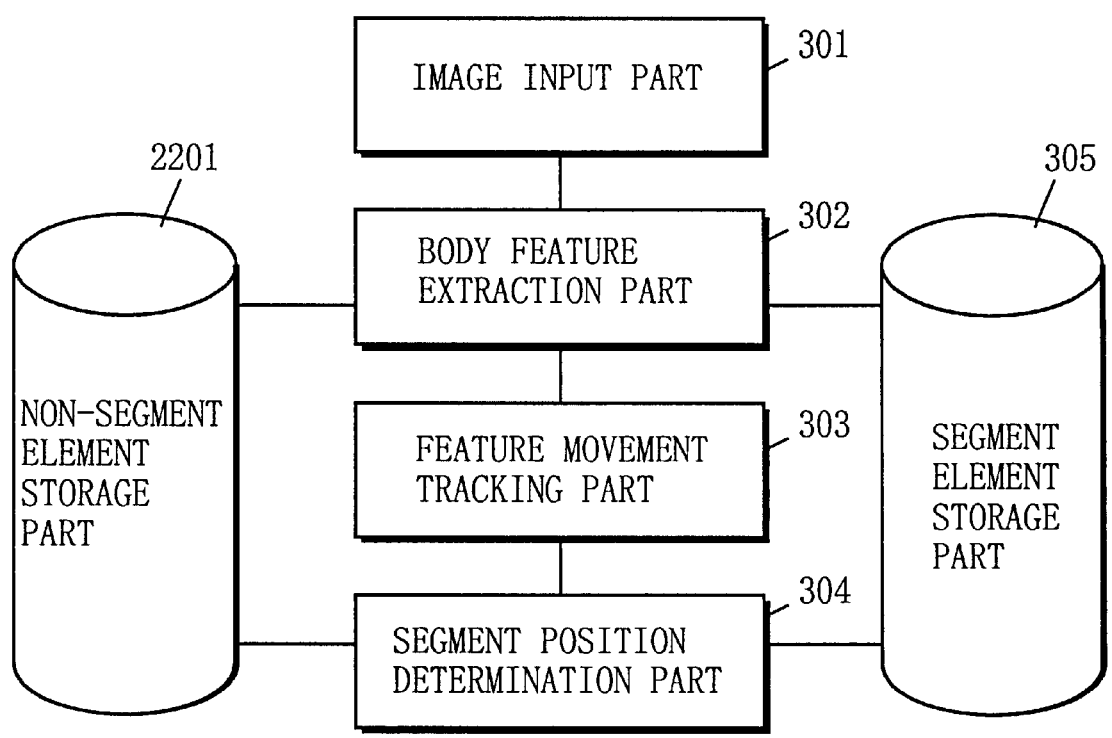
FIG. 22 is a block diagram showing the structure of a sign language gesture segmentation device according to a third embodiment of the present invention.

FIG. 22 is a block diagram showing the structure of a sign language gesture segmentation device according to a third embodiment of the present invention.

The device in FIG. 22 is additionally provided with a non-segment element storage part 2201 compared to the device in FIG. 3. The non-segment element storage part 2201 includes a previously-stored non-segment element which is a condition of non-segmentation. Other elements in this device are identical to the ones included in the device in FIG. 3.

Specifically, the device in FIG. 22 executes a method of segmenting sign language gestures such that, the non-segment element is detected as well as the segment element, and the sign language gestures are segmented in accordance therewith.

Hereinafter, a description is made of how the sign language gesture segmentation device structured in the aforementioned manner is operated to execute processing.

First of all, a description is made of case where a gesture of bringing hands closer to each other is detected as the non-segment element.

Figure 23:
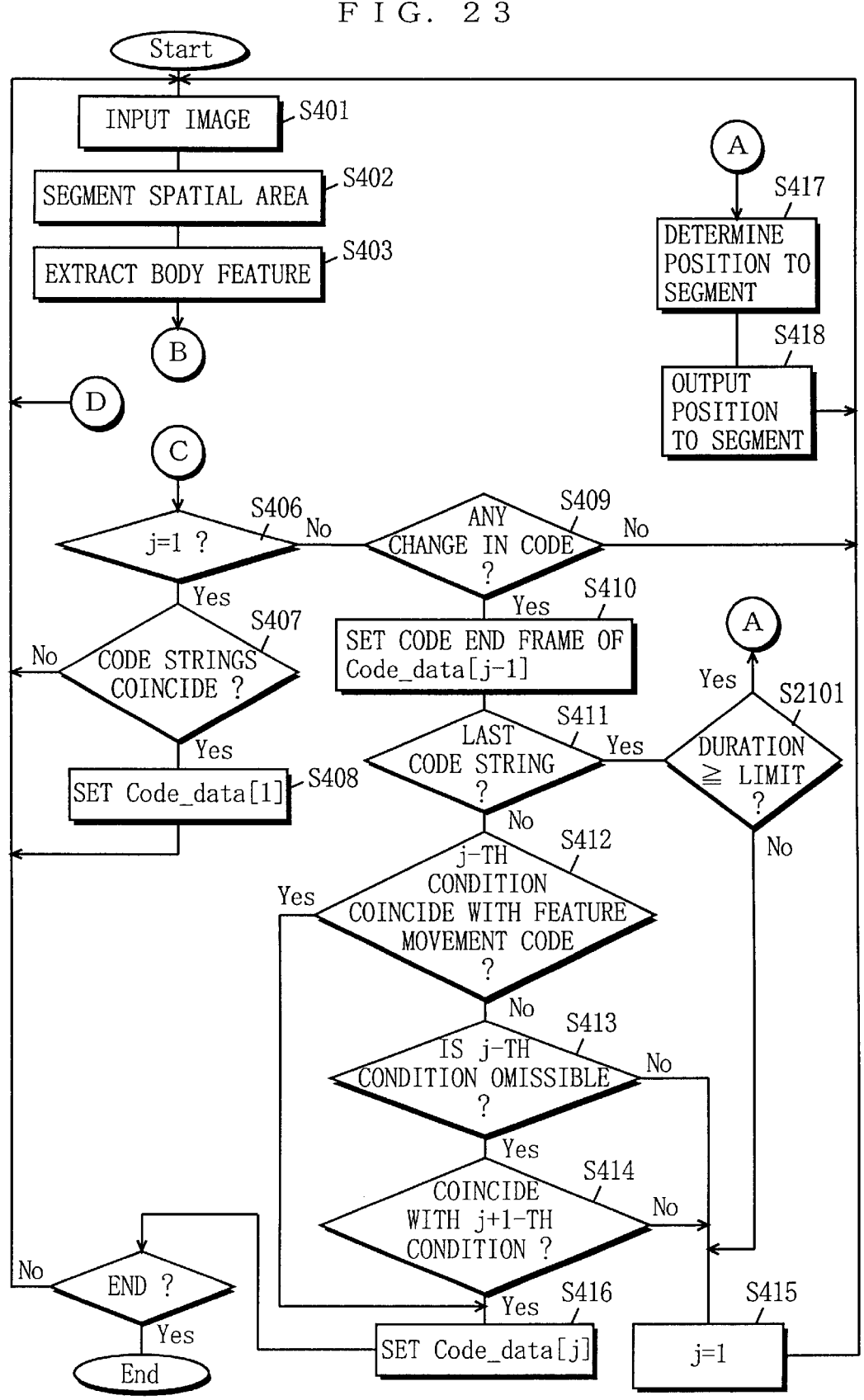
FIG. 23 is a flowchart exemplarily illustrating a procedure executed in the sign language gesture segmentation device in FIG. 22.
Figure 24:
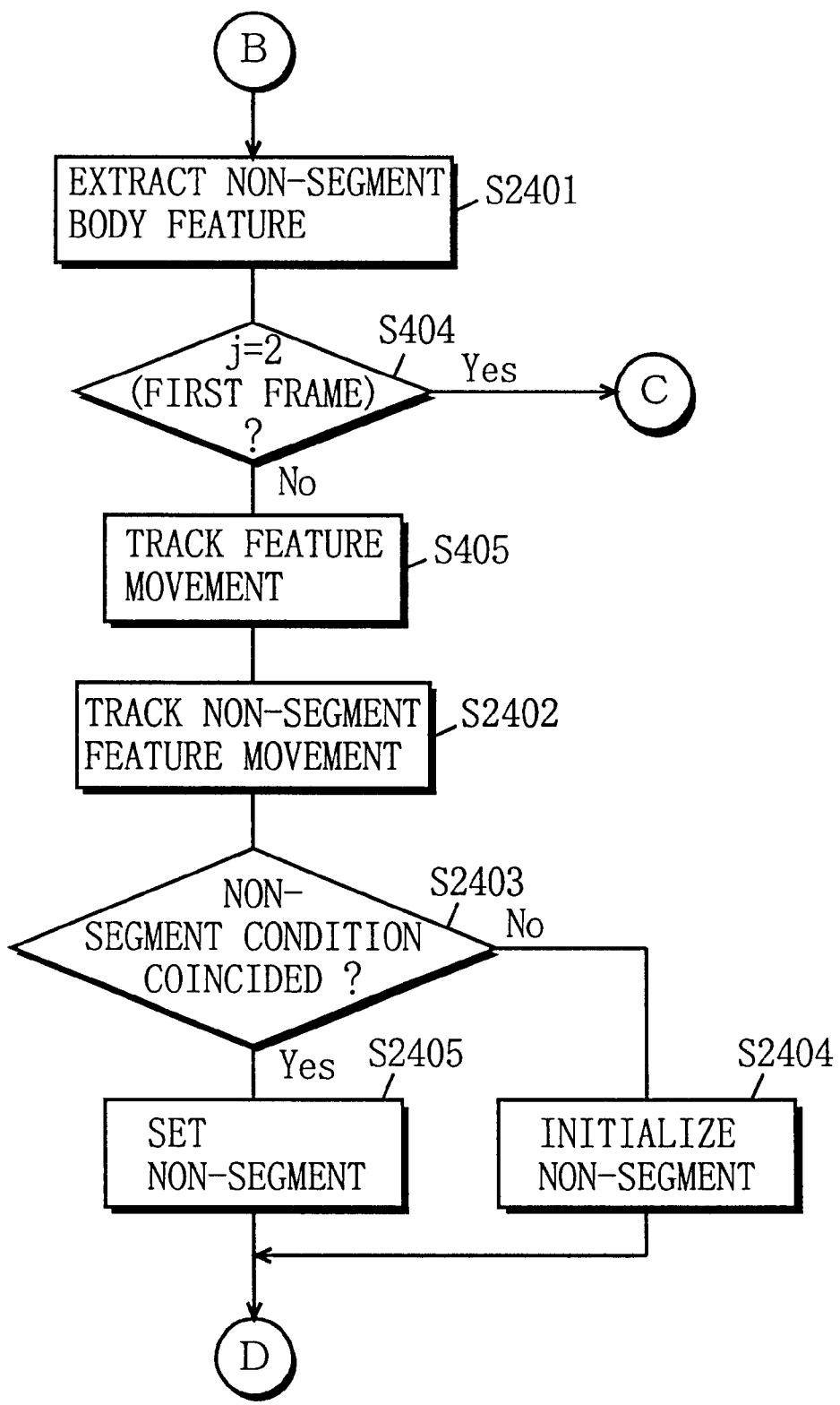
FIG. 24 is a flowchart exemplarily illustrating a procedure executed in the sign language gesture segmentation device in FIG. 22.

FIGS. 23 and 24 are flowcharts exemplarily illustrating how the sign language gesture segmentation device in FIG. 22 is operated to execute processing.

The methods illustrated in FIGS. 23 and 24 are similar to the method in FIG. 21, except step S2401 is added to step S403, steps S2402 to S2405 are added to step S405, and step S418 is altered in a similar manner to step S418a.

These steps (S2401 to S2405, and S418a) are respectively described in detai below.

[Step S2401]

The body feature extraction part 302 extracts images corresponding to the body features stored in the non-segment element storage part 2201 from the inputted images.

FIG. 25 is a diagram showing exemplary non-segment element data stored in them non-segment element storage part 2201.

In FIG. 25, the non-segment element data includes a body feature 2501 and a non-segment motion feature 2502.

To detect the gesture of bringing hands closer, for example, "hand region" is previously set to the body feature 2501.

The body feature extraction part 302 extracts the hand region as the non-segment body features. The hand region can be extracted by following the procedure in step S403c.

Thereafter, the procedure goes to step S404.

[Step S2402]

A non-segment feature movement code is determined in the following procedure.

When the number of hands of the i-th hand region information hand[i] is 2, the feature movement tracking part 303 finds, with <Equation 9>, a distance 1_hand[i] between hands in the i-th hand region by referring to the barycenter g1_hand[i] of the first hand of the i-th hand region information hand[i] and the barycenter g2_hand[i] of the second hand thereof.

$$\left. \begin{array}{l} g1\_hand[i] = (Xgh1[i], Ygh1[i]) \\ g2\_hand[i] = (Xgh2[i], Ygh2[i]) \\ 1\_hand[i] = \sqrt{(Xgh1[i] - Xgh2[i])^2 + (Ygh1[i] - Ygh2[i])^2} \end{array} \right\} \quad \langle \text{Equation 9} \rangle$$

Then, the feature movement tracking part 303 finds, with <Equation 10>, a change d1_hand[i] in the distance between hands by referring to the distance 1_hand[i] between hands in the i-th hand region and the distance 1_hand[i−1] between hands in the (i−1)th hand region.

$$d\_hand[i]=1\_hand[i]1\_hand[i-1] \quad <\text{Equation 10}>$$

When the number of hands of the i-th hand region information hand[i] is not 2, or when the number of hands of the i-th hand region information hand[i] and the number of hands of the (i−1)th hand region information hand[i−1] are not the same, the feature movement tracking part 303 sets the change d1_hand[i] in the distance between hands to any non-negative value, for example, 1000.

When the change d1_hand[i] in the distance between hands is d1_hand[i]≦−θ, the non-segment feature movement code is "1". When the change d1_hand[i] in the distance between hands is d1_hand[i]>−θ, the non-segment feature movement code is "0". Herein, θ stands for a threshold value of the change in the distance between hands, and is set to "5" in this embodiment, for example.

When a non-segment code number k has no value set, the non-segment code k is set to "1", and the number of non-segment feature frames is set to "0".

In this example, the non-segment code number k denotes the number of codes constituting the non-segment feature movement codes, and the number of the non-segment feature frames denotes the number of frames corresponding to the duration of the non-segment motion feature's detection, for example, the number of frames in the range between the frame where the detection is started and the frame where the detection is completed.

Thereafter, the procedure goes to step S3003.

[Step S2403]

The segment position determination part 304 refers to the non-segment element data (refer to FIG. 25) stored in the non-segment element storage part 2201, and checks whether or not the non-segment feature movement code coincides with the non-segment motion feature 2502. The non-segment motion feature 2502 is set with a parameter (non-segment motion feature parameter) indicating the motion feature for confirming non-segmentation (non-segment motion feature).

FIG. 26 is a diagram exemplarily showing non-segment motion feature parameters to be set in the non-segment motion feature 2502.

In FIG. 26, the non-segment motion feature parameters include a non-segment motion feature 2601, a determination code 2602, and time 2603. The non-segment motion feature 2601 indicates a type of the non-segment motion features. The determination code 2602 is a code string used as a condition to determine the non-segment motion features. The time 2603 is a time used as a condition to determine the non-segment motion features.

The determination code 2602 is described in a similar manner to the determination code 1002 included in the motion feature parameter in FIG. 10. The time 2603 is set to a minimum duration for the non-segment motion feature 2601.

When the determination code 2602 is different from the k-th code of the non-segment feature movement code determined in step S2402, for example, the last code constituting the non-segment feature movement code, the procedure goes to step S2404.

When being identical, the procedure goes to step S2405.

[Step S2404]

First, the number of the non-segment feature frames is set to "0" and then the non-segment code number k is set to "1".

Thereafter, the procedure advances to step S406.

[Step S2405]

The number of the non-segment feature frames is incremented by "1".

When k>2, if the (k−1)th code of the condition for non-segment confirmation code string is different from the non-segment feature movement code, k is incremented by "1".

Thereafter, the procedure goes to step S406.

[Step S418a]

When the time 2603 included in the non-segment motion feature parameter (refer to FIG. 26) is not set to any value, a minimum value for the non-segment time is set to 0.

When the time 2603 is set to any value, the minimum value for the non-segment time is set to the value of the time 2603.

When the number of the non-segment feature frames is smaller than the number of frames equivalent to the minimum value for the non-segment time, the position to segment set in step S417 is outputted.

Thereafter, the procedure returns to step S401.

In such manner, the method of segmenting sign language gestures in which the non-segment element (bringing hands closer to each other) is detected as well as the segment element, and the sign language gestures are segmented in accordance therewith can be realized.

Next, a description is made of a case where changing the shape of the mouth is detected as the non-segment element.

In this case, the processing in step S2401 is altered as follows.

[Step S2401a]

The body feature extraction part 302 extracts images corresponding to the body features stored in the non-segment element storage part 2201 from the inputted images.

In FIG. 25, when detecting any change in the shape of the mouth, "mouth" is previously set with the body feature 2501.

The body feature extraction part 302 extracts the mouth as non-segment body features. The mouth can be extracted in a similar manner to step S403b.

Thereafter, the procedure goes to step S404.

Moreover, the processing in step S2402 is also altered as follows.

[Step S2402a]

The non-segment feature movement code is determined by following the next procedure.

The feature movement tracking part 303 first finds, in a similar manner to step S405b, the change d_mouth[i] in the area of the mouth region of the i-th mouth region information and the vertical change y_mouth[i] in the length of the mouth of the i-th mouth region information.

Then, the feature movement tracking part 303 refers to the condition 1602 in FIG. 16, and then selects any condition of feature movements for mouth corresponding to the change d_mouth[i] in the area of the mouth region of the i-th mouth region information and the vertical change y_mouth[i] in the length of the mouth of the i-th mouth region information. Then, the feature movement tracking part 303 picks up a number corresponding to the selected condition of feature movements for the mouth from the movement code 1601 in FIG. 16, and then determines the non-segment feature movement code.

When the mouth is not moving, for example, no change is observed in the area and the vertical maximum length of the mouth. At this time, the non-segment feature movement code is "0".

When the non-segment code number k has no value set, the non-segment code number k is set to "1", and the number of the non-segment feature frames is set to "0".

Thereafter, the procedure goes to step S2403.

In such manner, the method of segmenting sign language gestures according to detection results of the non-segment element (changing the shape of mouth) as well as the segment element can be realized.

Next, a description is made of a case where symmetry of hand gestures is detected as the non-segment element.

In this case, the processing in step S2402 is altered as follows.

[Step S2402b]

The non-segment feature movement code is determined by following the next procedure.

The feature movement tracking part 303 first determines whether or not the number of hands of the i-th hand region information hand[i] is 1 or smaller. If the number is smaller than 1, the non-segment feature movement code is set to 0. Thereafter, the procedure goes to step S2403.

When the number of hands of the i-th hand region information hand[i] is 2, the feature movement tracking part 303 finds, with <Equation 11>, a movement vector vh[1][i] of the first hand in the i-th hand region and a movement vector vh[2][i] of the second hand therein by referring to the barycenter g1_hand[i] of the first hand of the i-th hand region information hand[i], the barycenter g2_hand[i] of the second hand thereof, the barycenter g1_hand[i−1] of the first hand of the (i−1)th hand region information hand[i−1], and the barycenter g2_hand[i−1] of the second hand thereof.

$$\begin{aligned}
&g1\_hand[i] = (Xgh1[i], Ygh1[i]) \\
&g1\_hand[i-1] = (Xgh1[i-1], Ygh1[i-1]) \\
&g2\_hand[i] = (Xgh2[i], Ygh2[i]) \\
&g2\_hand[i-1] = (Xgh2[i-1], Ygh2[i-1]) \\
&vh[1][i] = \begin{pmatrix} Xvh[1][i] \\ Yvh[1][i] \end{pmatrix} = \begin{pmatrix} Xgh1[i] - Xgh1[i-1] \\ Ygh1[i] - Ygh1[i-1] \end{pmatrix} \\
&vh[2][i] = \begin{pmatrix} Xvh[2][i] \\ Yvh[2][i] \end{pmatrix} = \begin{pmatrix} Xgh2[i] - Xgh2[i-1] \\ Ygh2[i] - Ygh2[i-1] \end{pmatrix}
\end{aligned} \quad \text{(Equation 11)}$$

Next, the feature movement tracking part 303 finds, with <Equation 12>, the moving quantity dvh[1][i] of the first hand in the i-th hand region and the moving quantity dvh[2][i] of the second hand in the i-th hand region.

$$\begin{aligned}
dvh[1][i] &= \sqrt{(Xvh[1][i] - Xvh[1][i-1])^2 + (Yvh[1][i] - Yvh[1][i-1])^2} \\
dvh[2][i] &= \sqrt{(Xvh[2][i] - Xvh[2][i-1])^2 + (Yvh[2][i] - Yvh[2][i-1])^2}
\end{aligned} \quad \text{(Equation 12)}$$

FIG. 27 shows conditions of non-segment feature movements for the symmetry of sign language gestures for the feature movement tracking part 303 to determine the non-segment feature movement code.

In FIG. 27, the conditions of the non-segment feature movements for the symmetry of sign language gestures include a movement code 2701 and a condition 2702. The movement code 2701 is set to numbers of "0" to "8", and the condition 2702 is set to the conditions of the non-segment feature movements for the symmetry of sign language gestures corresponding to the respective numbers set to the movement code 2701.

Thereafter, the feature movement tracking part 303 finds a movement code Ch[1][i] of the first hand in the i-th hand region and a movement code Ch[2][i] of the second hand therein by referring to the conditions of the non-segment feature movements for symmetry of sign language gestures in FIG. 27.

When the number of non-segment feature frames is 0, a starting point Psh[1] of the first non-segment condition is set to the barycenter g1_hand[i−1] of the first hand of the (i−1)th hand region information hand[i−1], and a starting point Psh[2] of the second non-segment condition is set to the barycenter g2_hand[i−1] of the second hand of the (i−1)th hand region information hand[i−1].

Herein, the non-segment element storage part 2201 includes previously-stored conditions of non-segment codes for symmetry of sign language gestures.

FIG. 28 is a diagram exemplarily showing conditions of the non-segment codes for symmetry of sign language gestures stored in the non-segment element storage part 2201.

For the conditions of non-segment codes in FIG. 28, symmetry observed in any gesture (sign language gesture) recognizable to the sign language recognition device (not shown) is set as conditions denoted by numbers 1 to 10.

For the sign language gestures, for example, the hands often symmetrically move to each other with respect to a vertical or horizontal surface to the body. It should be noted that, such conditions can be set in meaningless-hand gestures recognizable to the device.

Then, the segment position determination part 304 refers to the starting point Psh[1]=(Xps1, Yps1) of the first non-segment condition, the starting point Psh[2]=(Xps2, Yps2) of the second segment condition, the movement code Ch[1][i] of the first hand in the i-th hand region, and the movement code Ch[2][i] of the second hand in the i-th hand region, and then determines whether or not the feature movement codes for the symmetry of sign language gestures (that is, the movement code Ch[1][i] of the first hand in the i-th hand region, and the movement code Ch[2][i] of the second hand in the i-th hand region) coincide with the conditions in FIG. 28 (any condition among numbers 1 to 10). If Yes, the non-segment feature code is set to 1. If No, the non-segment feature code is set to 0.

Thereafter, the procedure goes to step S2403.

In such manner, the method of segmenting signer language gestures in which the non-segment element (symmetry of hand gestures) is detected as well as the segment element, and the sign language gestures are segmented in accordance therewith can be realized.

In the above segmenting method, however, the signer's gestures are two-dimensionally captured to detect the symmetry of his/her hand gestures. Accordingly, in this method, detectable symmetry thereof is limited to two-dimensional.

Therefore, hereinafter, a description will be made of a method in which the signer's gestures are stereoscopically captured to detect three-dimensional symmetry of his/her hand gestures.

In FIG. 22, the image input part 301 includes two cameras, and inputs three-dimensional images. In this manner, the signer's gestures can be stereoscopically captured.

In this case, the device in FIG. 22 is operated also in a similar manner to FIGS. 23 and 24 except for the following points being altered.

In detail, in step S403 in FIG. 23, the body feature extraction part 302 extracts images of the body features, for example, the hand region in this example, from the 3D inputted images from the two cameras.

In order to extract the hand region from the 3D images, the beige region may be detected according to the RGB color information as is done in a case where the hand region is extracted from 2D images. In this case, however, RGB color information on each pixel constituting the 3D images is described as a function of 3D coordinates in the RGB color information.

Alternatively, the method described in "Face Detection from Color Images by Fuzzy Pattern Matching" (written by Wu, Chen, and Yachida; paper published by The Electronic Information Communications Society, D-II Vol. J80-D-II No. 7 pp. 1774 to 1785, 1997. 7) may be used.

After the hand region has been detected, the body feature extraction part 302 finds 3D coordinates h[1][i] of the first hand in the i-th hand region and 3D coordinates h[2][i] of the second band in the i-th hand region.

In order to obtain 3D coordinates of the hand region extracted from the 3D images inputted from the two cameras, a parallax generated between the 2D images from one camera and the 2D images from the other camera may be utilized.

Further, the processing in step S2402*b* is altered as follows.

[Step S2402*c*]

The processing in this step is similar to step S2402*b*. Herein, information on the hand region calculated from the images inputted from either one camera, for example, the camera on the left is used.

Note that, the feature movement tracking part 303 finds a 3D vector vth[1][i] of the first hand in the i-th hand region and a 3D vector vth[2][i] of the second hand therein with <Equation 13>.

$$vth[1][i] = \begin{pmatrix} Xvth[1][i] \\ Yvth[1][i] \\ Zvth[1][i] \end{pmatrix} = \begin{pmatrix} Xh[1][i] - Xh[1][i-1] \\ Yh[1][i] - Yh[1][i-1] \\ Zh[1][i] - Zh[1][i-1] \end{pmatrix}$$

$$vth[2][i] = \begin{pmatrix} Xvth[2][i] \\ Yvth[2][i] \\ Zvth[2][i] \end{pmatrix} = \begin{pmatrix} Xh[2][i] - Xh[2][i-1] \\ Yh[2][i] - Yh[2][i-1] \\ Zh[2][i] - Zh[2][i-1] \end{pmatrix}$$

⟨Equation 13⟩

When the number of the non-segment feature frames is smaller than 3, the procedure goes to step S2403.

In such manner, the three-dimensional symmetry of the hand gestures can be detected.

Next, a description is made of how the change in symmetry of the hand gestures is detected in the aforementioned method of segmenting sign language gestures according to detection results of the non-segment element (symmetry of hand gestures) as well as the segment element.

Any change in the symmetry of gestures can be detected by capturing any change observed in a gesture plane. Herein, the gesture plane means a plane including the gesture's trail.

For example, the gesture plane for hands is a plane including a trail made by hand gestures. When any change is observed in either one gesture plane for the right hand or the left hand, it is considered symmetry of gestures being changed.

In order to detect any change in the gesture plane, for example, any change in a normal vector in the gesture plane can be detected.

Therefore, a description is now made of how to detect any change in the gesture plane by using the change in the normal vector in the gesture plane.

To detect any change in the gesture plane by using the change in the normal vector in the gesture plane, the processing in the step S2402 can be altered as follows.

[Step S2402*d*]

The feature movement tracking part 303 finds, with <Equation 14>, a normal vector vch[1][i] in a movement plane of the first hand in the i-th hand region by referring to the 3D vector vth[1][i] of the first hand in the i-th hand region and a 3D vector vth[1][i−1] of the first hand in the (i−1)th hand region, and finds a normal vector vch[2][i] in a movement plane of the second hand in the i-th hand region by referring to a 3D vector vth[2][i] of the second hand in the i-th hand region and a 3D vector vth[2][i−1] of the second hand in the (i−1)th hand region.

$$vch[1][i] = \begin{pmatrix} Xvch[1][i] \\ Yvch[1][i] \\ Zvch[1][i] \end{pmatrix} = \begin{pmatrix} Yvth[1][i]Zvth[1][i-1] - Zvth[1][i]Yvth[1][i-1] \\ Zvth[1][i]Xvth[1][i-1] - Xvth[1][i]Zvth[1][i-1] \\ Xvth[1][i]Yvth[1][i-1] - Yvth[1][i]Xvth[1][i-1] \end{pmatrix}$$

$$vch[2][i] = \begin{pmatrix} Xvch[2][i] \\ Yvch[2][i] \\ Zvch[2][i] \end{pmatrix} = \begin{pmatrix} Yvth[2][i]Zvth[2][i-1] - Zvth[2][i]Yvth[2][i-1] \\ Zvth[2][i]Xvth[2][i-1] - Xvth[2][i]Zvth[2][i-1] \\ Xvth[2][i]Yvth[2][i-1] - Yvth[2][i]Xvth[2][i-1] \end{pmatrix}$$

⟨Equation 14⟩

Further, the feature movement tracking part 303 finds, with <Equation 15>, a movement cosine cosΘh[1][i] of the first hand in the i-th hand region by referring to the normal vector vch[1][i] in the movement plane of the first hand in the i-th hand region and the normal vector vch[1][i−1] in the movement plane of the first hand in the (i−1)th hand region, and finds a movement cosine cosΘh[2][i] in the movement plane of the second hand in the i-th hand region by referring to the normal vector vch[2][i−1] in the movement plane of the second hand in the i-th hand region and the normal vector vch[2][i−1] in the movement plane of the second hand in the (i−1)th hand region.

$$\cos\theta 1[i] = \frac{(vch[1][i]\ vch[1][i-1])}{\|vch[1][i]\| \cdot \|vch[1][i-1]\|}$$

$$= \frac{Xvch[1][i]Xvch[1][i-1] + Yvch[1][i]Yvch[1][i-1] + Zvch[1][i]Zvch[1][i-1]}{\sqrt{Xvch[1][i]^2 + Yvch[1][i]^2 + Zvch[1][i]^2}\ \sqrt{Xvch[1][i-1]^2 + Yvch[1][i-1]^2 + Zvch[1][i-1]^2}}$$

$$\cos\theta 2[i] = \frac{(vch[2][i]\ vch[2][i-1])}{\|vch[2][i]\| \cdot \|vch[2][i-1]\|}$$

$$= \frac{Xvch[2][i]Xvch[2][i-1] + Yvch[2][i]Yvch[2][i-1] + Zvch[2][i]Zvch[2][i-1]}{\sqrt{Xvch[2][i]^2 + Yvch[2][i]^2 + Zvch[2][i]^2}\ \sqrt{Xvch[2][i-1]^2 + Yvch[2][i-1]^2 + Zvch[2][i-1]^2}}$$

⟨Equation 15⟩

When the movement cosine cosΘh[1][i] of the first hand in the i-th hand region and the movement cosine cosΘh[2][i] of the second hand therein fail to satisfy at least either one condition of the <Equation 16>, the non-segment feature code is set to 0. Herein, α_vc is a threshold value of a change of the normal vector, and is set to 0.1, for example.

$$\left.\begin{array}{l} 1 - \cos\theta 1[i] \le \alpha\_vc \\ 1 - \cos\theta 2[i] \le \alpha\_vc \end{array}\right\} \quad \langle\text{Equation 16}\rangle$$

Thereafter, the procedure goes to step S2403.

In such manner, any change in the gesture plane can be detected by using the change in the normal vector thereof.

Other than the aforementioned method, there is a method in which a gesture code vector is used to detect any change in the gesture plane.

Therefore, a description is now made of how the change in the gesture plane is detected by using the gesture code vector.

To detect any change in the gesture plane by using the gesture code vector, the processing in step S2402 is altered as follows.

[Step S2402e]

The feature movement tracking part 303 finds a 3D movement code Code_h1[i] of the first hand in the i-th hand region by referring to the 3D coordinates h1[i] of the first hand in the hand region and the 3D coordinates h1[i−1] of the first hand in the (i−1)th hand region, and finds a 3D movement code Code_h2[i] of the second hand in the i-th hand region by referring to the 3D coordinates h2[i] of the second hand in the i-th hand region and the 3D coordinates h2[i−1] of the second hand in the (i−1)th hand region.

Herein, a method of calculating the 3D movement code is taught in "Gesture Recognition Device" (Japanese Patent Laying-Open No. 7-282235). In this method, movements in the hand region are represented by the 27 pieces (from 0 to 26) of codes. These 27 pieces of codes respectively correspond to the 3D vectors whose directions are varying.

On the other hand, the non-segment element storage part 2201 includes a previously-stored identical gesture plane table.

Figures 29, 30:
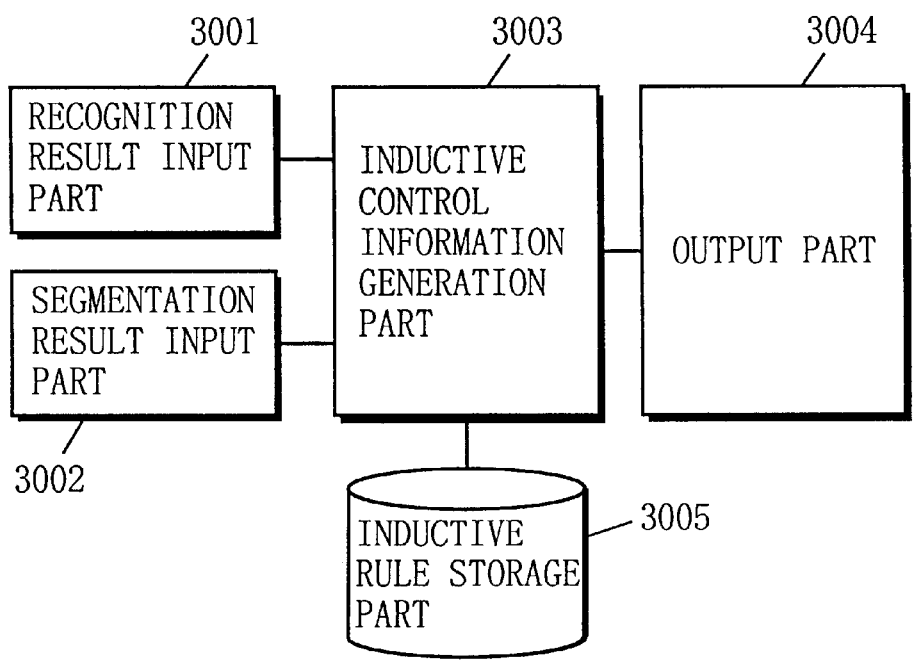
FIG. 29 is a diagram exemplarily showing an identical gesture plane table stored in the non-segment element storage part 2201.
FIG. 30 is a block diagram showing the structure of a segment element induction device according to a fourth embodiment of the present invention (the segment element induction device is additionally equipped to a not-shown sign language recognition device and the sign language gesture segmentation device in FIG. 3 or 22).

FIG. 29 is a diagram exemplarily showing an identical gesture plane table stored in the non-segment element storage part 2201.

In FIG. 29, the identical gesture plane table includes 9 pieces of the identical gesture planes (gesture plane numbers "1" to "9"). The identical gesture planes are respectively represented by the 27 pieces of code in a similar manner to the codes in the aforementioned method.

The feature movement tracking part 303 extracts, in accordance with the 3D coordinates h1[i] of the first hand in the i-th hand region, the gesture plane number including the first hand in the i-th hand region and the gesture plane number including the second hand in the i-th hand region from the table in FIG. 29.

When a potential gesture plane MOVE-plane1 of the first hand is not set, all the gesture plane numbers included in the extracted first hand are set in the potential gesture plane Move_pane1 of the first hand, and all the gesture plane numbers in the extracted second hand are set in a second potential gesture plane Move_plane2 of the second hand. Thereafter, the procedure goes to step S2403.

Next, the feature movement tracking part 303 judges whether or not any gesture plane number of the extracted first hand coincides with the gesture plane numbers set in Move_plane1, and whether or not any gesture plane number in the extracted second hand coincides with the gesture plane numbers set in Move_plane2.

When the judgement tells that none of the gesture plane numbers in the extracted first hand coincide with the gesture plane numbers set in Move_plane1, or none of the gesture plane numbers in the extracted second hand region coincide with the gesture plane numbers set in Move_plane2, the feature movement tracking part 303 deletes every gesture plane number set in Move_plane1 or in Move_plane2, and then sets 0 in the non-segment feature code. Thereafter, the procedure goes to step S2403.

When any gesture plane number in the extracted first hand region coincides with the gesture plane numbers set in Move_plane1, the feature movement tracking part 303 sets only the coincided numbers to Move_plane1, and deletes the rest therefrom.

When any gesture plane number in the extracted second hand coincides with the gesture plane numbers set in Move_plane2, the feature movement tracking part 303 sets only the coincided numbers in Move_plane2, and deletes the rest therefrom as long as one or more gesture plane numbers are set to the potential gesture plane Move_plane2 of the second hand. Thereafter, the procedure goes to step S2403.

In such manner, any change in the gesture plane can be detected by using the gesture code vector.

Next, a description is now made on a segment element induction device being additionally incorporated into the sign language recognition device (not shown) and the sign language gesture segmentation device in FIG. 3 or 22, and guiding the user to make transition gestures recognizable to the sign language gesture segmentation device to segment with animation on display.

Fourth Embodiment

FIG. 30 is a block diagram showing the structure of a segment element induction device according to a fourth embodiment of the present invention.

The segment element induction device in FIG. 30 is additionally incorporated into the sign language recognition device (not shown) and the sign language gesture segmentation device in FIG. 3 or 22.

In FIG. 30, the segment element induction device includes a recognition result input part 3001, a segmentation result input part 3002, an inductive control information generation part 3003, an output part 3004, and an inductive rule storage part 3005.

The recognition result input part 3001 receives current recognition status information from the sign language recognition device connected thereto. The segmentation result input part 3002 receives current segmentation status information from the sign language gesture segmentation device connected thereto.

The recognition result input part 3001 transmits the inputted recognition status information to the inductive control information generation part 3003. The segmentation result input part 3002 transmits the inputted segmentation status information to the inductive control information generation part 3003. The inductive control information generation part 3003 generates inductive control information by referring to the recognition status information and segmentation status information, and by using the inductive rule stored in the inductive rule storage part 3005, and then transmits the generated inductive control information to the output part 3004. The output part 3004 outputs the inductive control information to a device such as sign language animation device (not shown) connected thereto.

Hereinafter, a description will be made of how the segment element induction device structured in the aforementioned manner is operated.

Figures 31, 32:
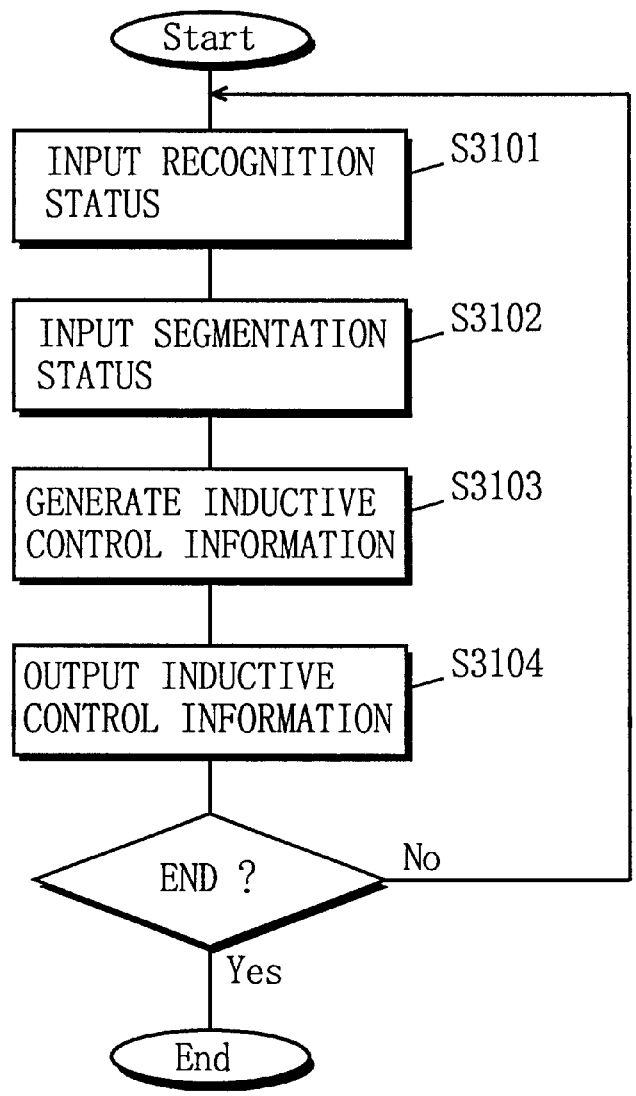
FIG. 31 is a flowchart for a procedure executed in the segment element induction device in FIG. 30.
FIG. 32 is a diagram exemplarily showing recognition status information inputted into a recognition result input part 3001.

FIG. 31 is a flowchart illustrating how the segment element induction device in FIG. 30 is operated.

The steps in FIG. 31 are respectively described in detail below.

[Step S3101]

The recognition result input part 3001 checks the recognition status information inputted from the sign language recognition device connected thereto.

FIG. 32 is a diagram exemplarily showing the recognition status information inputted into the recognition result input part 3001.

In FIG. 32, the recognition status information includes a frame number 3201 and a status flag 3202. To the frame number 3201, a current frame, in other words, a frame number of the frame in progress when the sign language recognition device is generating the recognition status information is set. The status flag 3202 is set to 0 if being succeed in recognition, or 1 if failed.

After the recognition status information is inputted, the recognition result input part 3001 transmits the same to the inductive control information generation part 3003.

Thereafter, the procedure goes to step S3102.

[Step S3102]

The segmentation result input part 3002 checks the segment status information inputted from the sign language gesture segmentation device.

FIG. 33 is a diagram showing exemplary segment status information inputted into the segmentation result input part 3002.

In FIG. 33, the segment status information includes a frame number 3301, and the number of not-yet-segmented frames 3302. In the frame number 3301, a current frame, in other words, a number of frame of the frame in progress when the sign language gesture segmentation device is generating the segmentation status information is set. In the number of not-yet-segmented frames 3302, the number of frames in the range from the last-segmented frame to the current frame is set.

After the segmentation status information is inputted, the segmentation result input part 3002 transmits the segmentation information to the inductive control information generation part 3003.

Thereafter, the procedure goes to step S3103.

[Step S3103]

The inductive control information generation part 3003 generates the inductive control information by using the inductive rule stored in the inductive rule storage part 3005.

FIG. 34 is a diagram exemplarily showing inductive control information generated by the inductive control information generation part 3003.

In FIG. 34, the inductive control information includes the number of control parts of body 3401, a control part of body 3402, and a control gesture 3403. In the number of control parts of body 3401, the number of the part(s) of body to be controlled in CG character (animation) is set. In the control part 3402, the part(s) of body to be controlled in the CG character is set. Note that, the control parts 3402 and the control gesture 3403 are both set therewith for the number of times equal to the number of parts set in the number of control parts 3401.

Next, the inducting control information generating part 3003 extracts the inductive rule from the inductive rule storage part 3005 in accordance with the currently inputted recognition status information and the segmentation status information.

FIG. 35 is a diagram exemplarily showing the inductive rule stored in the inductive rule storage part 3005.

In FIG. 35, the inductive rule includes a recognition status 3501, the number of not-yet-segmented frames 3502, a control part 3503, and a control gesture 3504.

For example, when the recognition status information in FIG. 32 and the segmentation status information in FIG. 33 are being inputted, the recognition status and the segmentation status coincide with the condition found in the second column of FIG. 35, the recognition status 3501 and the number of not-yet-segmented frames. Therefore, for the inductive control information in FIG. 34, the number of control parts 3401 is set to "1", the control parts 3402 is set to "head", and the control gesture 3403 is set to "nodding", respectively.

The inducing control information generated in such manner is transmitted to the output part 3004.

Thereafter, the procedure goes to step S3104.

[Step S3104]

The output part 3004 outputs the inductive control information transmitted from the inductive control information generation part 3003 into the animation generation device, for example. At this time, the output part 3004 transforms the inductive control information into a form requested by the animation generation device, for example, if necessary.

Thereafter, the procedure goes to step S3101.

In such manner, the method of inducing segment element can be realized.

Next, as to such method of inducing segment element, a description is now made on a case where a speed of animation is changed according to a recognition ratio of the sign language gestures.

Specifically, the recognition ratio of the sign language gestures obtained in the sign language recognition device is given to the segment element induction device side. The segment element induction device is provided with an animation speed adjustment device which lowers the speed of animation on display when the recognition ratio is low, and then guiding the user to make his/her transition gesture more slowly.

Figures 36, 37:
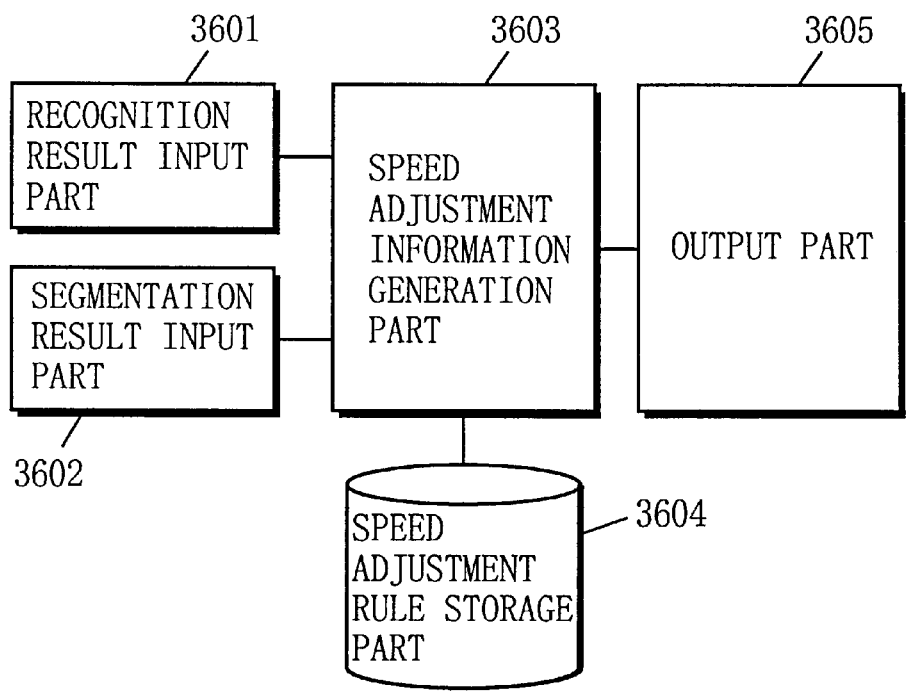
FIG. 36 is a block diagram showing the structure of an animation speed adjustment device provided to the segment element induction device in FIG. 30.
FIG. 37 is a diagram exemplarily showing a speed adjustment rule stored in a speed adjustment rule storage part 3604.

FIG. 36 is a block diagram showing the structure of the animation speed adjustment device provided to the segment element induction device in FIG. 30.

In FIG. 36, the animation speed adjustment device includes a recognition result input part 3601, a segmentation result input part 3602, a speed adjustment information generation part 3603, a speed adjustment rule storage part 3604, and an output part 3605.

The recognition result input part 3601 receives recognition result information from the sign language recognition device (not shown). The segmentation result input part 3602 receives segmentation result information from the sign language gesture segmentation device in FIG. 3 or 22. The speed adjustment rule storage part 3604 includes previously-stored speed adjustment rule. The speed adjustment information generation part 3603 generates control information (animation speed adjustment information) for controlling the speed of animation in accordance with the recognition result information at least, preferably both the recognition result information and segmentation result information while referring to the speed adjustment rule.

In this example, a description is made on a case where the speed adjustment information generation part 3603 generates the animation speed adjustment information in accordance with the recognition result information.

In the segment element induction device into which the animation speed adjustment device structured in the aforementioned manner is incorporated, processing is executed in a similar manner to FIG. 31, except the following points being different.

The processing in step S3103 in FIG. 31 is altered as follows.

[Step S3103a]

The speed adjustment information generation part 3603 sets 0 when an error recognition flag FLAG_rec is not set. When the status flag included in the recognition result information is 1, the error recognition flag FLAG_rec is incremented by 1. When the status flag is 0 with the error recognition flag being FLAG_rec>0, the error recognition flag FLAG_rec is subtracted by 1.

FIG. 37 is a diagram exemplarily showing the speed adjustment rule stored in the speed adjustment rule storage part 3604.

In FIG. 37, the speed adjustment rule includes a speed adjustment amount 3701 and a condition 3702. The condition 3702 is a condition used to determine the speed adjustment amount. Herein, d_spd found in the condition 3702 is a speed adjustment parameter, and is set to 50, for example.

The speed adjustment information generation part 3603 finds the speed adjustment amount d_spd appropriate to the error recognition flag FLAG_rec while referring to the speed adjustment rule stored in the speed adjustment rule storage part 3604.

The speed adjustment amount obtained in such manner is transmitted to the output part 3605.

Note that, the processing other than the above is executed in a similar manner to step S3103, and is not described again.

Further, the processing in step S3104 is altered as follows.
[Step S3104a]

The output part 3605 transmits the speed adjustment amount d_spd to the animation generation device (not shown). The animation generation device adjusts the speed of animation such that the speed Spd_def of default animation is lowered by about the speed adjustment amount d_spd.

In such manner, when the recognition ratio of the sign language gesture is low, the speed of animation on display can be lowered, thereby guiding the user to make his/her transition gesture more slowly.

Next, a description is made on a case where a camera concealing part is provided to conceal the camera from the user's view in the aforementioned segment element induction device (refer to FIG. 22; note that, there is no difference whether or not the animation speed adjustment device is provided thereto).

When the camera is exposed, the signer may become self-conscious and get nervous when making his/her hand gestures. Accordingly, the segmentation cannot be done in a precise manner and the recognition ratio of the sign language recognition device may be lowered.

Figure 38:
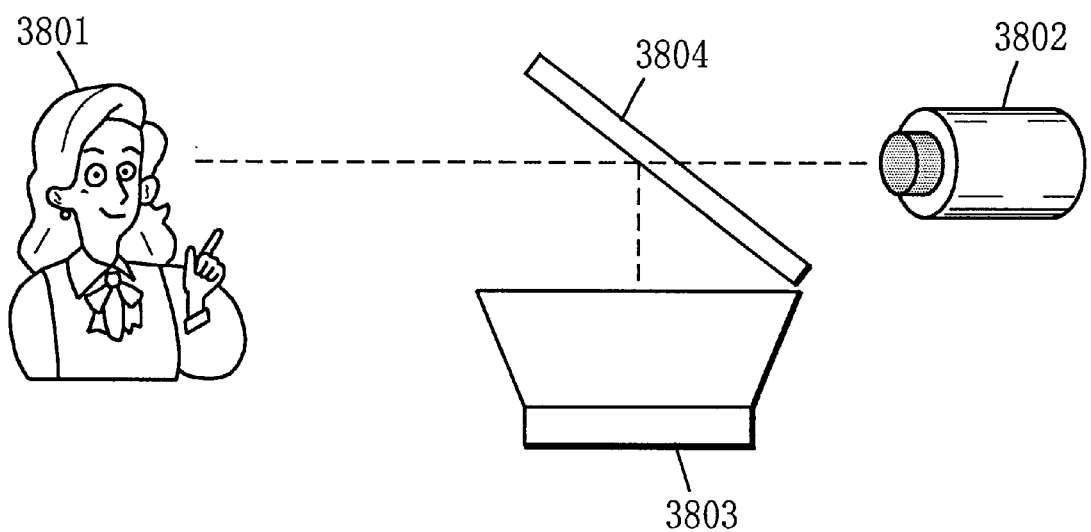
FIG. 38 is a schematic diagram exemplarily showing the structure of a camera hiding part provided to the segment element induction device in FIG. 22.

FIG. 38 is a schematic diagram exemplarily showing the structure of a camera hiding part provided to the segment element induction device in FIG. 22.

In FIG. 38, a camera 3802 is placed in a position opposite to a signer 3801, and an upward-facing monitor 3803 is placed in a vertically lower position from a straight line between the camera 3802 and the signer 3801.

The camera hiding part includes a halfmirror 3804 which allows light coming from forward direction to pass through, and reflect light coming from reverse direction. This camera hiding part is realized by placing the half mirror 3804 on the straight line between the signer 3801 and the camera 3802, and also in a vertically upper position from the monitor 3802 where an angle of 45 degrees is obtained with respect to the straight line.

With this structure, the light coming from the monitor 3803 is first reflected by the half mirror 3804 and then reaches the signer 3801. Therefore, the signer 3801 can see the monitor 3803 (animation displayed thereon).

The light directing from the signer 3801 to the camera 3802 is allowed to pass through the half mirror 3804, while the light directing from the camera 3802 to the signer 3801 is reflected by the half mirror. Therefore, this structure allows the camera 3802 to photograph the signer 3801 even though the camera is invisible from the signer's view.

With such camera hiding part, the camera can be invisible from the signer's view.

While the invention has been described in detail, the foregoing description is in all aspects illustrative and not restrictive. It is understood that numerous other modifications and variations can be devised without departing from the scope of the invention.

What is claimed is:

1. A method of automatically segmenting a subject's hand gestures into words or apprehensible units structured as a plurality of words when recognizing the subject's hand gestures, said method comprising:

storing transition feature data including a feature of a transition gesture which is not observed in the subject's body during a gesture representing a word, but is observed when transiting from one gesture to another;

photographing the subject, and storing image data thereof;

extracting an image corresponding to a part of the body in which the transition gesture is observed from the image data;

detecting a motion of the image corresponding to the part of the body in which the transition gesture is observed; and segmenting the hand gestures by comparing the motion of the image corresponding to the part of the body in which the transition gesture is observed with the transition feature data, and then finding a time position where the transition gesture is observed.

2. A method of automatically segmenting a subject's hand gestures according to claim 1, wherein the transition gesture comprises blinking.

3. A method of automatically segmenting a subject's hand gestures according to claim 1, wherein the transition gesture comprises nodding.

4. A method of automatically segmenting a subject's hand gestures according to claim 1, wherein the transition gesture comprises closing a mouth.

5. A method of automatically segmenting a subject's hand gestures according to claim 1, wherein the transition gesture comprises stopping a motion of at least one hand.

6. A method of automatically segmenting a subject's hand gestures according to claim 1, wherein the transition gesture comprises stopping a motion of the body.

7. A method of automatically segmenting a subject's hand gestures according to claim 1, wherein the transition gesture comprises touching a face with at least one hand.

8. A method of automatically segmenting a subject's hand gestures according to claim 1, further comprising setting a meaningless-hand region around the subject in which no hand gesture is considered effective even if a hand is observed, wherein the transition gesture comprises a movement of the hand into or out from the meaningless-hand region.

9. A method of automatically segmenting a subject's hand gestures according to claim 1, wherein said segmenting of the hand gestures comprises measuring a duration of the transition gesture, and then segmenting the hand gestures in relation to the duration.

10. A method of automatically segmenting a subject's hand gestures according to claim 1, further comprising:

storing non-transition feature data including a feature of a non-transition gesture which is not observed in the body when transiting from a gesture representing a word to another, but is observed during a gesture representing a word;

extracting an image corresponding to a part of the body in which the non-transition gesture is observed from the image data;

detecting a motion of the image corresponding to the part of the body in which the non-transition gesture is observed; and finding a time position where the non-transition gesture is observed by comparing the motion of the image corresponding to the part of the body in which the non-transition gesture is observed with the non-transition feature data, wherein said segmenting of the hand gestures does not occur at the time position where the non-transition gesture is observed.

11. A method of automatically segmenting a subject's hand gestures according to claim 10, wherein the non-transition gesture comprises bringing hands closer to each other than a value predetermined for a distance between the hands.

12. A method of automatically segmenting a subject's hand gestures according to claim 10, wherein the non-transition gesture comprises changing a shape of a mouth.

13. A method of automatically segmenting a subject's hand gestures according to claim 10, wherein the non-transition gesture comprises a motion of moving a right hand symmetrical to a left hand, or vice-versa.

14. A method of automatically segmenting a subject's hand gestures according to claim 13, wherein said photographing of the subject and storing image data thereof comprises stereoscopically photographing the subject and storing 3D image data thereof;

said extracting of the image corresponding to a part of the body in which the non-transition gesture is observed comprises extracting a 3D image corresponding to the part of the body in which the non-transition gesture is observed from the 3D image data;

said detecting of the motion of the image corresponding to the part of the body in which the non-transition gesture is observed comprises detecting a motion of the 3D image; and said finding of the time position where the non-transition gesture is observed comprises:

detecting whether changes in a gesture plane for the right hand and a gesture plane for the left hand are in accordance with the motion of the 3D image, and if neither of the gesture planes shows a change, determining that the non-transition gesture is being observed and finding a time position of the non-transition gesture.

15. A method of automatically segmenting a subject's hand gestures according to claim 14, wherein said detecting of whether changes in a gesture plane for the right hand and a gesture plane for the left hand comprises detecting whether changes in a gesture plane for the right hand and a gesture plane for the left hand are in accordance with a change in a normal vector to the gesture planes.

16. A method of automatically segmenting a subject's hand gestures according to claim 14, further comprising:

generating, as to a plurality of 3D gesture codes corresponding to a 3D vector whose direction is varying, a single-motion plane table in which a combination of the 3D gesture codes found in a single plane is included; and converting the motion of the 3D image into a 3D gesture code string represented by the plurality of 3D gesture codes, wherein said detecting of whether changes in a gesture plane for the right hand and a gesture plane for the left hand comprises detecting whether changes in a gesture plane for the right hand and a gesture plane for the left hand are in accordance with the single-motion plane table.

17. A method of automatically segmenting a subject's hand gestures according to claim 1, further comprising:

storing image data of an animation representing the transition gesture;

detecting a status of the transition gesture's detection and a status of the hand gesture's recognition; and visually displaying the animation representing the transition gesture to the subject in relation to the status of the transition gesture's detection and the status of the hand gesture's recognition.

18. A method of automatically segmenting a subject's hand gestures according to claim 17, wherein said visually displaying of the animation comprises changing a speed of the animation in accordance with the status of the hand gesture's recognition.

19. A method of automatically segmenting a subject's hand gestures according to claim 1, wherein said storing transition feature data comprises previously storing transition feature data.

20. A method of automatically segmenting a subject's hand gestures according to claim 10, wherein said storing non-transition feature data comprises previously storing non-transition feature data.

21. A computer program embodied on a computer readable medium for use with a computer for automatically segmenting a subject's hand gestures into words or apprehensible units structured by a plurality of words, said computer program comprising:

computer readable program code operable to instruct the computer to store transition feature data including a feature of a transition gesture which is not observed in the subject's body during a gesture representing a word, but is observed when transiting from one gesture to another;

computer readable program code operable to instruct the computer to instruct a camera to photograph the subject and store image data thereof;

computer readable program code operable to instruct the computer to extract an image corresponding to a part of the body in which the transition gesture is observed from the image data;

computer readable program code operable to instruct the computer to detect a motion of the image corresponding to the part of the body in which the transition gesture is observed; and computer readable program code operable to instruct the computer to segment the hand gestures by comparing the motion of the image corresponding to the part of the body in which the transition gesture is observed with the transition feature data, and then find a time position where the transition gesture is observed.

22. A computer program according to claim 21, further comprising:

computer readable program code operable to instruct the computer to store non-transition feature data including a feature of a non-transition gesture which is not observed in the body when transiting from a gesture representing a word to another, but is observed during a gesture representing a word;

computer readable program code operable to instruct the computer to extract an image corresponding to a part of the body in which the non-transition gesture is observed from the image data;

computer readable program code operable to instruct the computer to detect a motion of the image corresponding to the part of the body in which the non-transition gesture is observed; and computer readable program code operable to instruct the computer to find a time position where the non-transition gesture is observed by comparing the motion of the image corresponding the part of the body in which the non-transition gesture is observed with the non-transition feature data, wherein said computer readable program code operable to instruct the computer to segment the hand gestures is further operable to instruct the computer to not segment the hand gestures at the time position where the non-transition gesture is observed.

23. A computer program according to claim 21, further comprising:

computer readable program code operable to instruct the computer to store image data of an animation representing the transition gesture;

computer readable program code operable to instruct the computer to detect a status of the transition gesture's detection and a status of the hand gesture's recognition; and computer readable program code operable to instruct the computer to visually display the animation representing the transition gesture to the subject in relation to the status of the transition gesture's detection and the status of the hand gesture's recognition.

24. A computer program according to claim 21, wherein said computer readable program code operable to instruct the computer to store transition feature data comprises computer readable program code operable to instruct the computer to previously store transition feature data.

25. A computer program according to claim 22, wherein said computer readable program code operable to instruct the computer to store non-transition feature data comprises computer readable program code operable to instruct the computer to previously store non-transition feature data.

26. A computer program according to claim 23, wherein said computer readable program code operable to instruct the computer to store image data of an animation representing the transition gesture comprises computer readable program code operable to instruct the computer to previously store image data of an animation representing the transition gesture.

27. A hand gesture segmentation device for automatically segmenting a subject's hand gestures into words or apprehensible units structured by a plurality of words when recognizing the subject's hand gestures, said device comprising:

means for storing transition feature data including a feature of a transition gesture which is not observed in the subject's body during a gesture representing a word, but is observed when transiting from one gesture to another;

means for photographing the subject, and storing image data thereof;

means for extracting an image corresponding to a part of the body in which the transition gesture is observed;

means for detecting a motion of the image corresponding to the part of the body in which the transition gesture is observed; and means for segmenting the hand gestures by comparing the motion of the image corresponding to the part of the body in which the transition gesture is observed with the transition feature data, and then finding a time position where the transition gesture is observed.

28. A hand gesture segmentation device according to claim 27, further comprising:

means for storing non-transition data including a feature of a non-transition gesture which is not observed in the body when transiting from a gesture representing a word to another, but is observed during a gesture representing a word;

means for extracting an image corresponding to a part if the body in which the non-transition gesture is observed from the image data;

means for detecting a motion of the image corresponding to the part of the body in which the non-transition gesture is observed; and means for finding a time position where the non-transition gesture is observed by comparing the motion of the image corresponding to the part of the body in which the non-transition gesture is observed with the non-transition feature data, wherein said means for segmenting the hand gestures does not execute segmentation with respect to the hand gestures at the time position where the non-transition gesture is observed.

29. A motion induction device being incorporated in a hand gesture recognition device for recognizing a subject's hand gestures, and in a hand gesture segmentation device for automatically segmenting the hand gesture into words or apprehensible units structured by a plurality of words to visually guide the subject to make a predetermined gesture, said hand gesture segmentation device including a function of detecting a transition gesture which is not observed in the subject's body during a gesture representing a word, but is observed when transiting from one gesture to another, and then segmenting the hand gestures, said motion induction device comprising:

means for storing image data of an animation representing the transition gesture;

means for detecting a status of the transition gesture's detection and a status of the hand gesture's recognition by monitoring said hand gesture segmentation device and said hand gesture recognition device; and means for visually displaying the animation representing the transition gesture to the subject in relation to the status of the transition gesture's detection and the status of the hand gesture's recognition.

30. A motion induction device according to claim 29, wherein said means for visually displaying the animation comprises means for changing a speed of the animation according to the status of the hand gesture's recognition.

31. A motion induction device according to claim 29, wherein said means for storing image data of an animation representing the transition gesture comprises means for previously storing image data of an animation representing the transition gesture.

32. A hand gesture segmentation device for automatically segmenting a subject's hand gestures into words or apprehensible units structured by a plurality of words when recognizing the subject's hand gestures, said device comprising:

means for storing transition feature data including a feature of a transition gesture which is not observed in the subject's body during a gesture representing a word, but is observed when transiting from one gesture to another;

means for photographing the subject with a camera placed in a position opposite to the subject, and storing image data thereof;

means for extracting an image corresponding to a part of the body in which the transition gesture is observed from the image data;

means for detecting a motion of the image corresponding to the part of the body in which the transition gesture is observed;

means for segmenting the hand gesture by comparing the motion of the image corresponding to the part of the body in which the transition gesture is observed with the transition feature data, and then finding a time position where the transition gesture is observed;

means for visually displaying the animation representing the transition gesture to the subject in relation to the status of the transition gesture's detection and the status of the hand gesture's recognition; and means for concealing said camera from the subject's view.

33. A hand gesture segmentation device according to claim 32, wherein said animation display means comprises an upward-facing monitor in a vertically lower position from a straight line between the subject and said camera, and said means for concealing said camera comprises a half mirror operable to allow light coming from a forward direction to pass and through and to reflect light coming from a reverse direction, wherein said half mirror is placed on the straight line between the subject and said camera in a vertically upper position from said monitor where an angle of 45° is obtained with respect to the straight line.

* * * * *